(12) United States Patent
Komoriya

(10) Patent No.: US 7,995,587 B2
(45) Date of Patent: Aug. 9, 2011

(54) TIME STAMP ADDING DEVICE, TIME STAMP ADDING METHOD, AND TIME STAMP ADDING PROGRAM

(75) Inventor: Yota Komoriya, Tokyo (JP)

(73) Assignee: Sony Corporation (JP)

( * ) Notice: Subject to any disclaimer, the term of this patent is extended or adjusted under 35 U.S.C. 154(b) by 76 days.

(21) Appl. No.: 12/462,703

(22) Filed: Aug. 7, 2009

(65) Prior Publication Data

US 2010/0040083 A1 Feb. 18, 2010

(30) Foreign Application Priority Data

Aug. 12, 2008 (JP) ................................ P2008-208139

(51) Int. Cl.
*H04L 12/28* (2006.01)
(52) U.S. Cl. ................... 370/395.64; 370/350; 370/304; 375/355; 375/359
(58) Field of Classification Search .................. None
See application file for complete search history.

(56) References Cited

U.S. PATENT DOCUMENTS

| 7,372,858 B2 * | 5/2008 | Tomita | 370/395.64 |
| 7,693,188 B2 * | 4/2010 | Robinett et al. | 370/486 |
| 7,693,222 B2 * | 4/2010 | Balakrishnan et al. | 375/240.28 |

FOREIGN PATENT DOCUMENTS

| JP | 2872104 B2 | 1/1999 |
| JP | 2005223914 A | 8/2005 |
| JP | 2006067427 A | 3/2006 |
| JP | 2006067568 A | 3/2006 |
| JP | 2007104085 A | 4/2007 |

OTHER PUBLICATIONS

Office Action from Japanese Application No. 2008-208139, dated May 25, 2010.

\* cited by examiner

*Primary Examiner* — Huy D Vu
*Assistant Examiner* — Zewdu Beyen
(74) *Attorney, Agent, or Firm* — Lerner, David, Littenberg, Krumholz & Mentlik, LLP

(57) ABSTRACT

A time stamp adding device includes: PCR_PID detecting means for detecting a PCR_PID included in a PMT by searching TS packets included in a TS from the head of the TS including TS packets having no time stamp, input from the outside and transmitted in a MPEG2-TS format and analyzing the resulting PMT; PCR detecting means for detecting values of PCRs included between the head of the TS and the PMT and position information of the PCRs and detecting values of all PCRs in the TS packets between the PMT and the tail of the TS and position information of the PCRs in the TS; time interval calculating means for calculating a time interval for adding a time stamp and a value of the time stamp based on the PCR values; and time stamp adding means for adding the time stamps to the TS packets having no time stamp based on the time interval.

10 Claims, 9 Drawing Sheets

INPUT DATA(MPEG2-TS)

188 BYTE
TS PACKET

OUTPUT DATA (MPEG2-TS HAVING TIME STAMP ADDED THERETO)

192 BYTE
TIME STAMP (4 BYTE)

US 7,995,587 B2

TIME STAMP ADDING DEVICE, TIME STAMP ADDING METHOD, AND TIME STAMP ADDING PROGRAM

CROSS-REFERENCE TO RELATED APPLICATION

The present application claims priority from Japanese Patent Application No. JP 2008-208139 filed in the Japanese Patent Office on Aug. 12, 2008, the entire content of which is incorporated herein by reference.

BACKGROUND OF THE INVENTION

1. Technical Field

The present invention relates to a time stamp adding device, a time stamp adding method, and a time stamp adding program, which can add a time stamp to a TS packet being transmitted in the format of MPEG2-TS (MPEG2-Transport Stream) and having no time stamp added thereto.

2. Related Art

In the past, a time stamp adding device was known which added a time stamp as decoding and reproduction time information to a video stream compressed and encoded by a video encoder and sent out the video stream to a transmission system (see Japanese Patent No. 2872104).

SUMMARY OF THE INVENTION

However, such a time stamp adding device is merely a device for replacing the time stamp of a video stream having a counterfeit time stamp already added thereto with a real time stamp. It is difficult to apply such a technique to new addition of a time stamp to a video stream having no time stamp in contents provided by broadcasting organizations or the like.

Regarding MPEG2-TS data constituting such a video stream, the data rate of contents with high vision is generally 15 to 25 Mbp and an amount of transmission data may increase when the time of the contents is great.

The hardware scale for adding the time stamp to the MPEG2-TS data constituting the video stream tends to increase to allow the rapidly processing of the video stream with a great quantity of data.

According to the inventor's detailed study on adding a time stamp to the MPEG2-TS, a time stamp may not be added to the vicinity of the head of the MPEG2-TS data. Accordingly, the accuracy of the time stamps added to TS packets of the MPEG2-TS data may be damaged.

Therefore, there is a need for a time stamp adding device, a time stamp adding method, and a time stamp adding program, which can improve the accuracy of time stamps added to TS packets of MPEG2-TS data and reduce the hardware scale.

The gist of the invention is that it is possible to improve the accuracy of time stamps added to TS packets of MPEG2-TS data and reduce the hardware scale by the use of a configuration of detecting a PCR (Program Clock Reference) included between the head of a TS (Transport Stream) and a detected PCR_PID (Program Clock Reference Packet Identifier) by analyzing TS packets included between the head of the TS and the detected PCR_PID, and detecting values of all the PCRs included in the TS packets between the detected PCR_PID and the tail of the TS and position information of the PCRs in the TS.

The above-mentioned gist of the invention is specifically embodied by the following means.

According to an embodiment of the invention, there is provided a time stamp adding device including: PCR_PID detecting means for searching TS packets included in a TS from the head of the TS including a plurality of TS packets having no time stamp added thereto, being input from the outside, and being transmitted in a MPEG2-TS format and to detect a PCR_PID included in a PMT (Program Map Table) by analyzing the PMT obtained as the search result; PCR detecting means for detecting values of PCRs included between the head of the TS and the PMT and position information of the PCRs in the TS and detecting values of all PCRs included in the TS packets between the PMT and the tail of the TS and position information of the PCRs in the TS by analyzing the TS packets included between the head of the TS and the PMT; time interval calculating means for calculating a time interval for adding a time stamp and a value of the time stamp to be added on the basis of the PCR values detected by the PCR detecting means; and time stamp adding means for adding the time stamps calculated by the time interval calculating means to the TS packets having no time stamp added thereto, which is input from the outside, on the basis of the time interval calculated by the time interval calculating means.

According to this configuration, a PCR_PID included in a PMT is detected by the PCR_PID detecting means by searching TS packets included in a TS from the head of the TS including a plurality of TS packets having no time stamp added thereto, being input from the outside, and being transmitted in a MPEG2-TS format and analyzing the PMT obtained as the search result, the values of PCRs included between the head of the TS and the PMT and position information of the PCRs in the TS are detected and the values of all PCRs included in the TS packets between the PMT and the tail of the TS and position information of the PCRs in the TS are detected by the PCR detecting means by analyzing the TS packets included between the head of the TS and the PMT, a time interval for adding a time stamp and a value of the time stamp to be added on the basis of the PCR values detected by the PCR detecting means are calculated by the time interval calculating means, and the time stamps calculated by the time interval calculating means are added to the TS packets having no time stamp added thereto, which is input from the outside, by the time stamp adding means on the basis of the time interval calculated by the time interval calculating means. Accordingly, it is possible to improve the accuracy of the time stamps and to reduce the hardware scale.

According to another embodiment of the invention, there is provided a time stamp adding method including the steps of: detecting a PCR_PID included in a PMT by searching TS packets included in a TS from the head of the TS including a plurality of TS packets having no time stamp added thereto, being input from the outside, and being transmitted in a MPEG2-TS format and analyzing the PMT obtained as the search result; detecting values of PCRs included between the head of the TS and the PMT and position information of the PCRs in the TS and detecting values of all PCRs included in the TS packets between the PMT and the tail of the TS and position information of the PCRs in the TS by analyzing the TS packets included between the head of the TS and the PMT; calculating a time interval for adding a time stamp and a value of the time stamp to be added on the basis of the PCR values detected in the step of detecting the values of PCRs; and adding the time stamps calculated in the step of calculating the time interval to the TS packets having no time stamp added thereto, which is input from the outside, on the basis of the time interval calculated in the step of calculating the time interval.

According to this configuration, a PCR_PID included in a PMT is detected by searching TS packets included in a TS from the head of the TS including a plurality of TS packets having no time stamp added thereto, being input from the outside, and being transmitted in a MPEG2-TS format and analyzing the PMT obtained as the search result, the values of PCRs included between the head of the TS and the PMT and position information of the PCRs in the TS are detected and the values of all PCRs included in the TS packets between the PMT and the tail of the TS and position information of the PCRs in the TS are detected by analyzing the TS packets included between the head of the TS and the PMT, a time interval for adding a time stamp and a value of the time stamp to be added on the basis of the PCR values detected are calculated, and the calculated time stamps are added to the TS packets having no time stamp added thereto, which is input from the outside, on the basis of the calculated time interval. Accordingly, it is possible to improve the accuracy of the time stamps and to reduce the hardware scale.

According to still another embodiment of the invention, there is provided a time stamp adding program installed in a computer of a time stamp adding device for adding a time stamp to a TS including TS packets having no time stamp added thereto and being transmitted in a MPEG2-TS format, the time stamp adding program instructing the computer of the time stamp adding device to perform the steps of: detecting a PCR_PID included in a PMT by searching TS packets included in a TS from the head of the TS including a plurality of TS packets having no time stamp added thereto, being input from the outside, and being transmitted in a MPEG2-TS format and analyzing the PMT obtained as the search result; detecting values of PCRs included between the head of the TS and the PMT and position information of the PCRs in the TS and detecting values of all PCRs included in the TS packets between the PMT and the tail of the TS and position information of the PCRs in the TS by analyzing the TS packets included between the head of the TS and the PMT; calculating a time interval for adding a time stamp and a value of the time stamp to be added on the basis of the PCR values detected in the step of detecting the values of PCRs; and adding the time stamps calculated in the step of calculating the time interval to the TS packets having no time stamp added thereto, which is input from the outside, on the basis of the time interval calculated in the step of calculating the time interval.

According to this configuration, a PCR_PID included in a PMT is detected by searching TS packets included in a TS from the head of the TS including a plurality of TS packets having no time stamp added thereto, being input from the outside, and being transmitted in a MPEG2-TS format and analyzing the PMT obtained as the search result, the values of PCRs included between the head of the TS and the PMT and position information of the PCRs in the TS are detected and the values of all PCRs included in the TS packets between the PMT and the tail of the TS and position information of the PCRs in the TS are detected by analyzing the TS packets included between the head of the TS and the PMT, a time interval for adding a time stamp and a value of the time stamp to be added on the basis of the PCR values detected are calculated, and the calculated time stamps are added to the TS packets having no time stamp added thereto, which is input from the outside, on the basis of the calculated time interval. Accordingly, it is possible to improve the accuracy of the time stamps and to reduce the hardware scale.

According to the above-mentioned embodiments of the invention, it is possible to improve the accuracy of time stamps added to TS packets of MPEG2-TS data and to reduce the hardware scale.

BRIEF DESCRIPTION OF THE DRAWINGS

FIG. 3 is a diagram schematically illustrating an example of MPEG2-TS data which is the processing target of the time stamp adding device according to the first embodiment of the invention and which no time stamp is added to.

DESCRIPTION OF PREFERRED EMBODIMENTS

Hereinafter, a time stamp adding device 1 according to preferred embodiments of the invention will be described in detail with reference to the accompanying drawings.

First Embodiment

Figure 1:
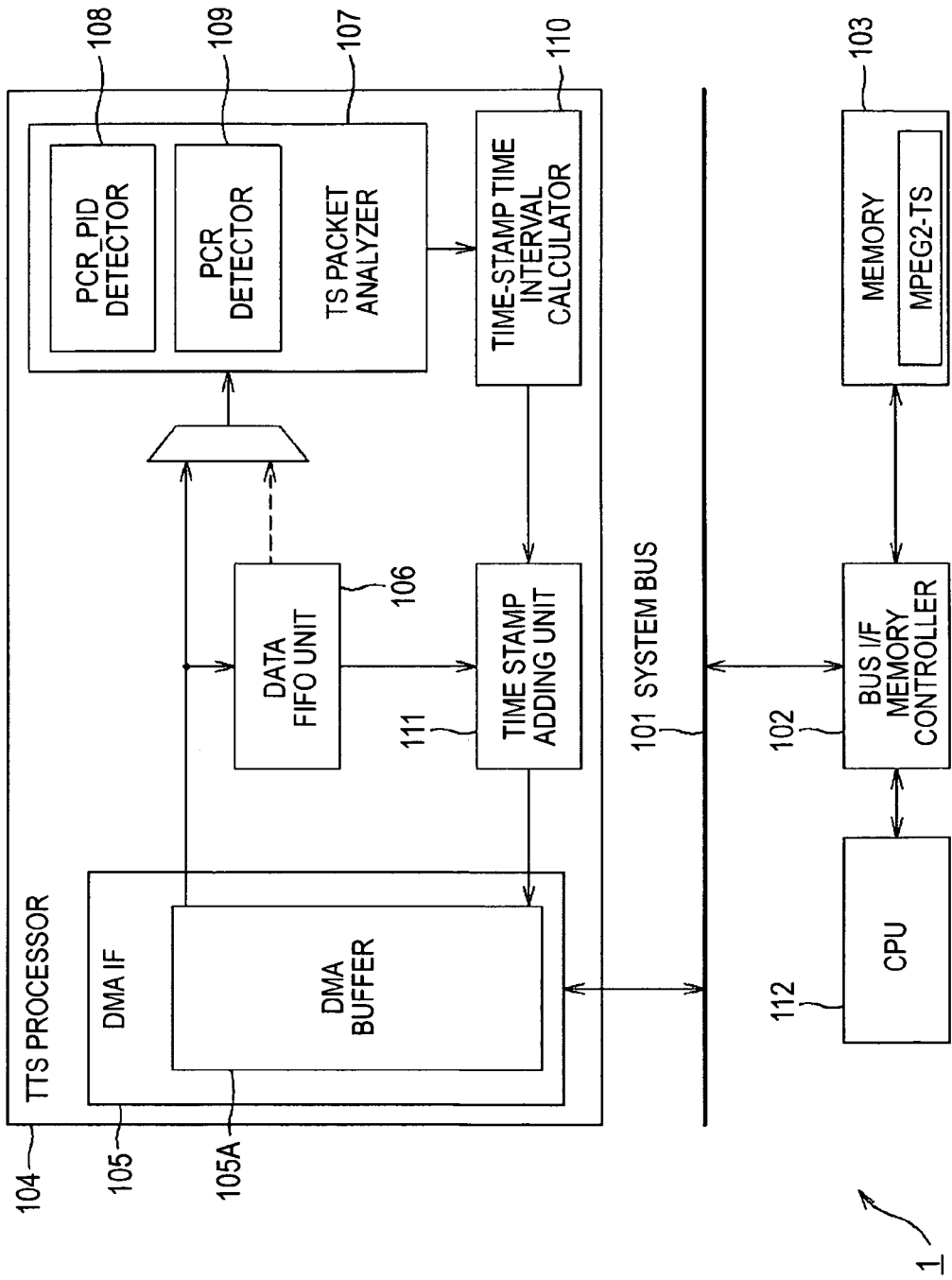
FIG. 1 is a block diagram illustrating a configuration of a time stamp adding device according to a first embodiment of the invention.

FIG. 1 is a block diagram illustrating a configuration of a time stamp adding device 1 according to a first embodiment of the invention.

Figure 2A:
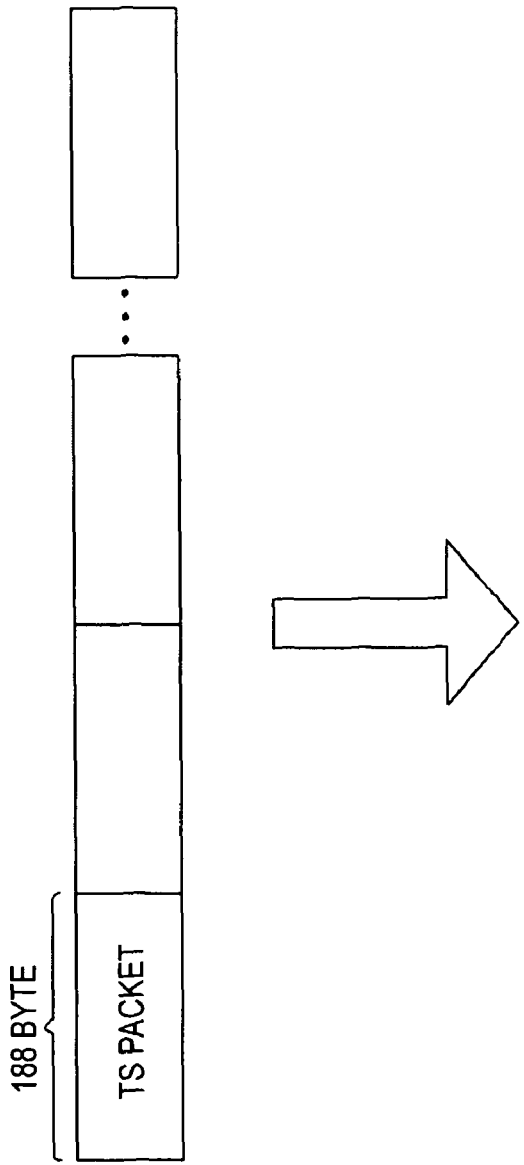
FIGS. 2A and 2B are diagrams schematically illustrating processes carried out by the time stamp adding device according to the first embodiment of the invention.
Figure 2B:
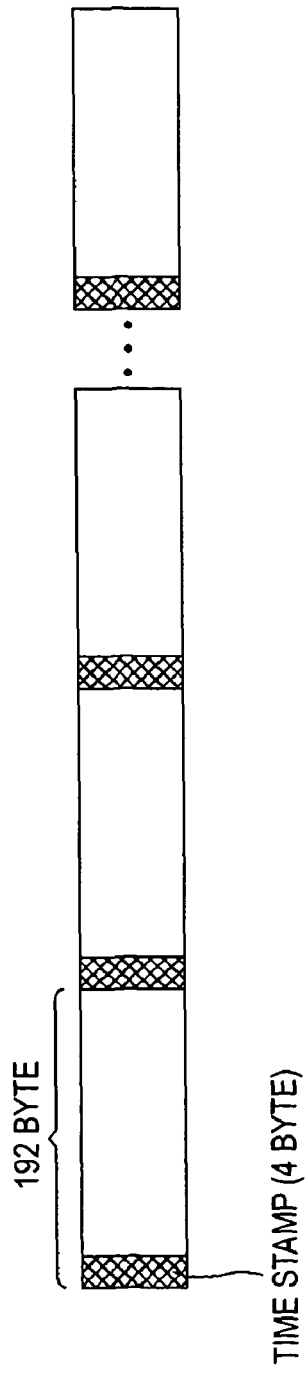

As shown in FIGS. 2A and 2B, the time stamp adding device 1 according to the first embodiment is a device for adding time stamps having 4 byte data based on the same 27 MHz clock as PCR to TS packets having no time stamp added thereto, which are stored in a semiconductor memory 103 built in the time stamp adding device 1 and are transmitted in the format of 188-byte MPEG2-TS, to generate TS packets having the time stamps added thereto and outputting the generated TS packets having the time stamps added thereto to the outside.

As shown in FIG. 1, the time stamp adding device 1 according to the first embodiment includes a bus interface 102 being connected to a system bus 101 and having a memory controller built therein, a semiconductor memory 103 from and to which data can be read and written by the memory controller built in the bus interface 102, a CPU 112 connected to the bus interface 102, and a TTS processor 104 connected to the bus interface 102 via the system bus 101.

The TTS processor 104 includes a DMA interface 105, a DATA FIFO unit 106, a TS packet analyzer 107, a time-stamp time interval calculator 110, and a time stamp adder 111.

The DMA interface 105 has a DMA buffer 105A, which temporarily stores TS data read from the semiconductor memory by the bus interface 102 and transmitted through the system bus, built therein.

The TS packet analyzer 107 includes a PCR_PID detector 108 and a PCR detector 109. The TS packet analyzer 107 performs a process of determining whether MPEG2-TS data is transmitted to the DMA buffer 105A built in the DMA interface 105 from the bus interface 102.

The MPEG2-TS data, having no time stamp added thereto as the processing target to which the time stamps should be added, is stored in the semiconductor memory 103.

Figure 3:
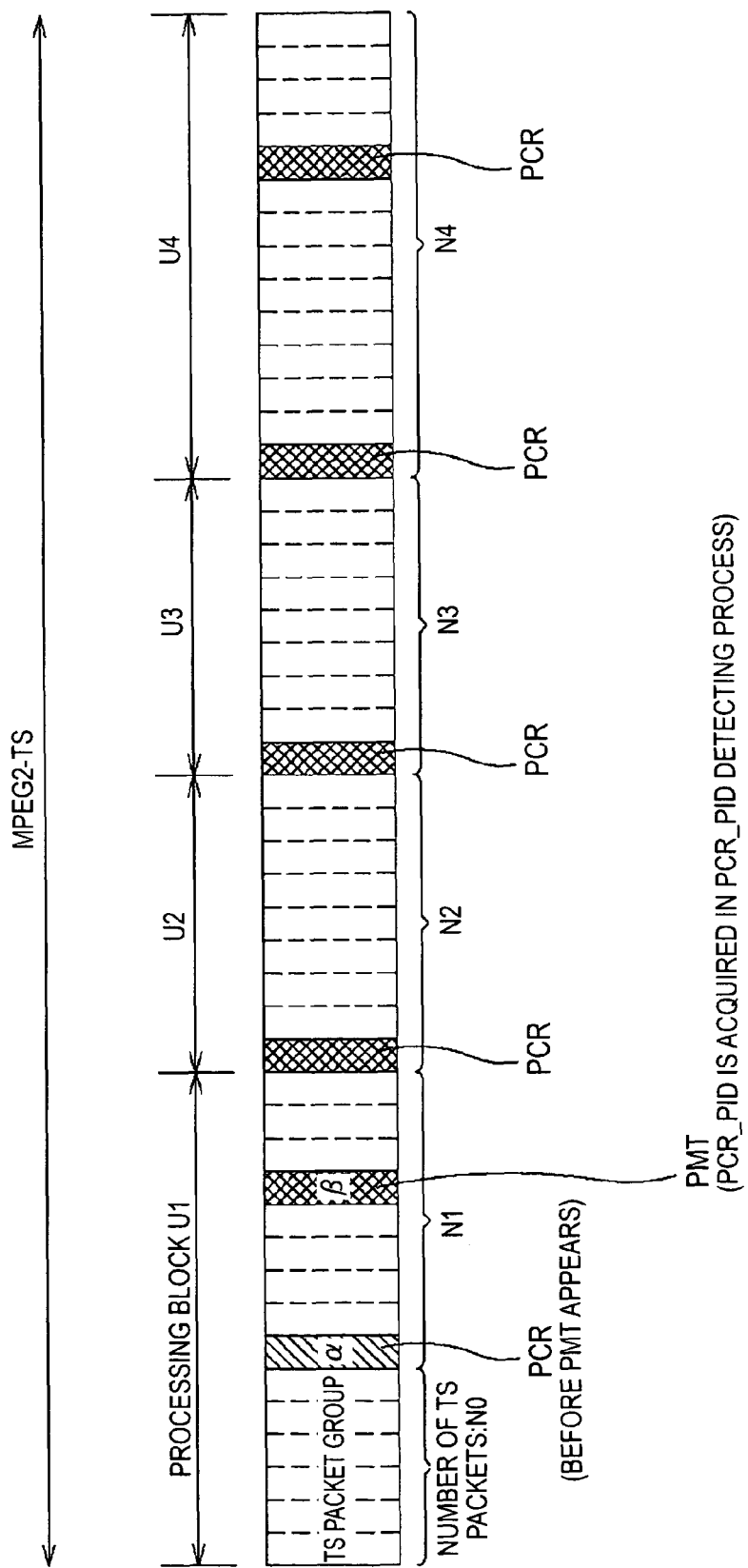

FIG. 3 is a diagram schematically illustrating an example of the MPEG2-TS data having no time stamp added thereto as the processing target of the time stamp adding device 1 according to the first embodiment.

The MPEG2-TS data, having no time stamp added thereto as the processing target of the time stamp adding device 1 according to the first embodiment, includes a processing block U1 including a PCR packet α first appearing from the head of the MPEG2-TS data, and a PMT packet β with the number of TS packets N0+N1, a processing block U2 including a PCR packet with the number of TS packets N2, a processing block U3 including a PCR packet with the number of TS packets N3, and a processing block U4 including a PCR packet with the number of TS packets N3.

In the time stamp adding device 1 according to the first embodiment, when the MPEG2-TS data is input to the time stamp adding device 1, PCR_PID data is acquired by the PCR_PID detector and PMT data is detected from the PCR_PID data.

Thereafter, the data from the head of the stream to the PMT is searched by the PCR detector 109 and PCR data is detected as the search result.

When the TS data shown in FIG. 3 is input, the time stamp adding device 1 according to the first embodiment divides the TS data into the processing block U1, the processing block U2, the processing block U3, and the processing block U4 on the basis of the detected position of PCR.

In the time stamp adding device 1 according to the first embodiment, the CPU 112 has a function of reading a TS packet adding program from a main memory not shown and transmitting a reading instruction for reading the MPEG2-TS from the semiconductor memory to the DMA interface by the use of the read TS packet adding program and a function of enabling a DMA transmission between the DMA interface and the bus interface 102 by describing the address of the MPEG2-TS in the DMA descriptor.

The bus interface 102 is connected to the system bus 101 for transmitting data inside the main body of the time stamp adding device 1 and controls an operation of reading data from the semiconductor memory 103 and an operation of writing data to the semiconductor memory 103 by the use of the built-in memory controller not shown.

The bus interface 102 according to the first embodiment has a function of reading data of the MPEG2-TS packets from the semiconductor memory 103 and transmitting the read data of MPEG2-TS packets to the DMA interface 105, a function of writing the data of MPEG2-TS packets having a time stamp added thereto and being transmitted from the DMA interface 105 to the semiconductor memory, and a function of transmitting a notification that the DMA transmission is ended using means for interrupting CPU 112 or setting up a flag bit in a register when the DMA transmission of all the TS packets is ended.

The DMA interface 105 is an interface having the DMA buffer 105A temporarily storing the data of TS packets transmitted in a DMA transmission manner, serves as a DMA bus master, and has a function of temporarily storing the data of TS packets transmitted in a DMA transmission manner from the semiconductor memory 103 via the bus interface 102 in the built-in DMA buffer 105A and a function of outputting the TS packets having a time stamp added thereto, which is output from the time stamp adder 111, to the bus interface 102 in a DMA transmission manner.

The DMA buffer 105A is a buffer built in the DMA interface 105 to temporarily store the data of TS packets transmitted in the DMA transmission manner and to receive the data of TS packets transmitted in the DMA transmission manner.

The PCR_PID detector 108 has a function of determining whether TS packets are transmitted from the semiconductor memory 103 to the DMA buffer 105A built in the DMA interface 105 and reading the data of TS packets stored in the DMA buffer 105A when it is determined that the TS packets are transmitted to the DMA buffer 105A built in the DMA interface 105, a function of determining whether the PCR_PID in the TS packets read from the DMA buffer 105A is known, a function of detecting the PCR_PID included in the PMT by analyzing the PMT included in the read MPEG2-TS from the head of MPEG2-TS read from the DMA buffer 105A when it is determined that the PCR_PID is unknown, a function of acquiring a PCR value and position information of the TS packet in the TS by detecting the TS packet having the same value of PCR_PID as the detected value of PCR_PID from the TS and then analyzing the detected TS packet, a function of transmitting the data of TS packets read from the MDA buffer 105A to the DATA FIFO unit 106, and a function of reading the data of TS packets from the DMA buffer 105A built in the DMA interface 105 and transmitting the read data of TS packets to the DATA FIFO unit 106 when a data amount output from a second output port of the DATA FIFO unit 106 to be described later is zero.

The DATA FIFO unit 106 is a memory storing the data of TS packets read from the semiconductor memory 103 and read in the DMA buffer 105A in a FIFO (First-In First-Out) manner.

The DATA FIFO unit 106 according to the first embodiment includes an input port inputting data of TS packets from the outside, a first output port outputting the TS packets input from the input port to the time stamp adder 111, and a second output port outputting the TS packets input from the input port to the PCR detector 109 so as to check whether a PCR is included in the TS packets input from the input port.

The input port is a port inputting the data of TS packets read from the DMA buffer 105A built in the DMA interface 105.

Figure 4:
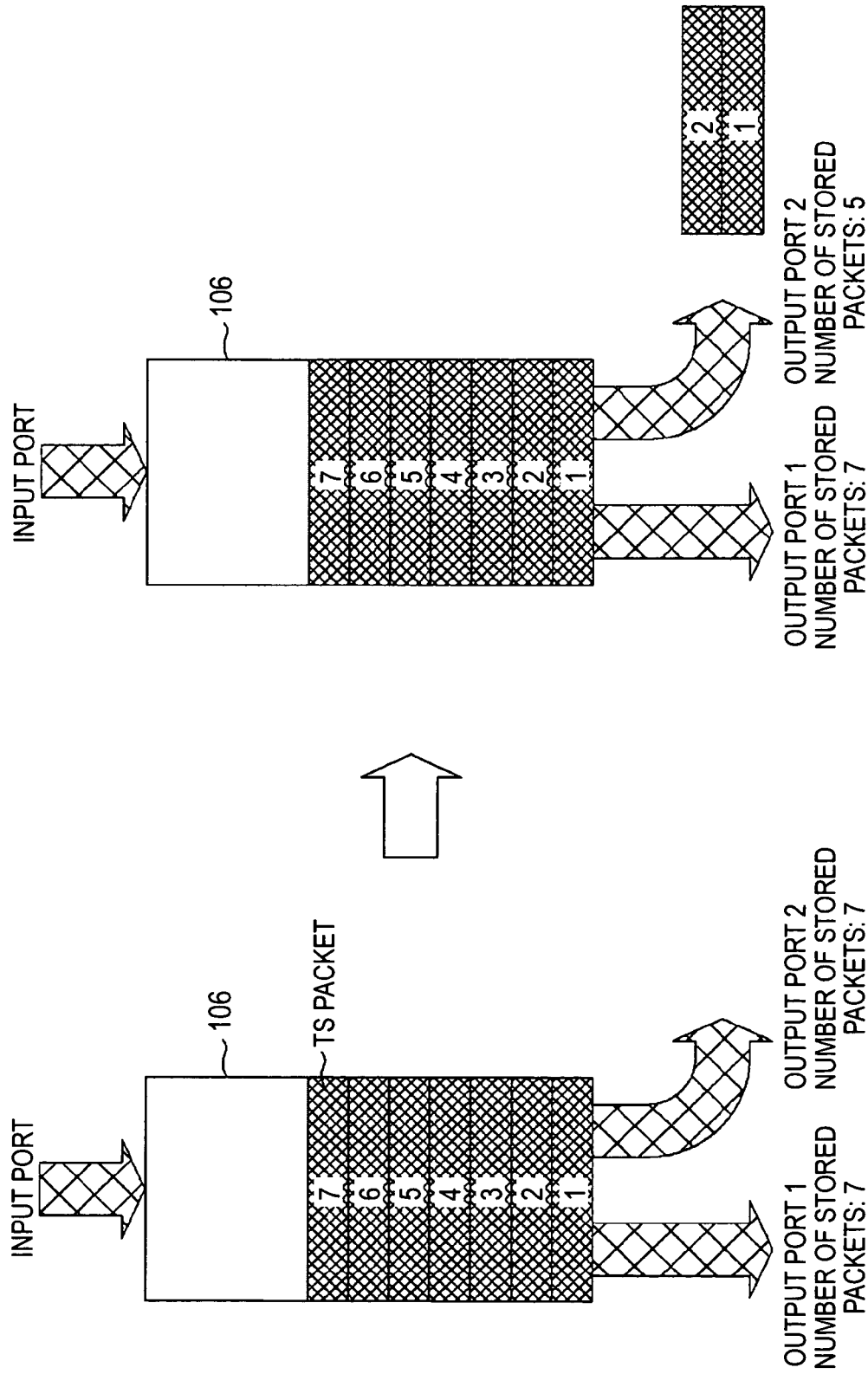
FIG. 4 is a diagram schematically illustrating a DATA FIFO unit of the time stamp adding device according to the first embodiment of the invention.

The first output port of the DATA FIFO unit 106 according to the first embodiment has an output indicating that the number of data of the TS packets stored in the DATA FIFO unit 106 is seven when seven TS packets read from the DMA buffer 105A are input from the input port and stored, for example, as shown in FIG. 4.

In this state, as shown in FIG. 4, even when the TS packets corresponding to two data are read from the second output port by the PCR detector 109, the data of TS packets stored in the DATA FIFO unit 106 is not really deleted and thus the first output port has an output indicating that the number of data of TS packets stored in the DATA FIFO unit 106 is seven which is the number of data of TS packets stored in the DATA FIFO unit 106 with respect to the first output port.

For example, as shown in FIG. 4, when seven TS packets read from the DMA buffer 105A are input and stored from the input port, the second output port of the DATA FIFO unit 106 according to the first embodiment has an output indicating that the number of data of TS packets stored in the DATA FIFO unit 106 is seven.

In this state, when the TS packets corresponding to two data are read from the second output port, the second output port outputs to the PCR detector 109 an output indicating that the number of data of TS packets which it has not been checked yet whether the PCR stored in the DATA FIFO unit 106 is included in is five, as the result of subtracting two TS packets, which are the number of data of TS packets output to the PCR detector 109, from seven data of TS packets stored in the DATA FIFO unit 106 which is the number of data of TS packets stored in the DATA FIFO unit 106 with respect to the second output port.

That is, the second output port is an output port allowing the PCR detector 109 to check whether the PCR is included in the data of TS packets stored in the DATA FIFO unit 106.

The DATA FIFO unit 106 according to the first embodiment performs a FIFO process of outputting the data of TS packets stored in the DATA FIFO unit 106 to the PCR detector 109 in a state where the input of TS packets from the input port is stopped when the check on whether the PCR is included in the TS packet is started for all the TS packets input from the input port and resuming the input of TS packets from the input port when the check on whether the PCR is included in the TS packet is started for all the TS packets input from the input port.

The PCR detector 109 has a function of reading the data of TS packets temporarily stored in the DATA FIFO unit 106 from the second output port of the DATA FIFO unit 106 when a TS packet which is not subjected to the check on whether the PCR is included in is stored in the DATA FIFO unit 106, a function of detecting a value of the PCR included between the head of the TS and the PMT and position information of the PCR in the TS by analyzing the TS packets included between the head of the TS and the PMT, a function of detecting all values of PCRs included in the TS packets between the PMT and the tail of the TS and position information of the PCRs in the TS, and a function of outputting a PCR detection notification indicating that the data of PCR is detected from the TS, the detected values of PCRs and the position information of the PCRs in the TS to the time-stamp time interval calculator 110 at the time of detecting the data of PCR from the TS.

The PCR detector 109 according to the first embodiment may be embodied by hardware or software, or may be embodied by a combination of software and hardware.

When the PCR detection notification indicating that the data of PCR is detected from the TS is received, the time-stamp time interval calculator 110 calculates a time interval between a first detected PCR and a PCR detected subsequent to the first detected PCR in the TS packets included in a first addition target block existing between the head of TS and the first detected PCR from the value of the first detected PCR, the value of PCR detected subsequent to the first detected PCR, and the number TS packets between the first detected PCR and the PCR detected subsequent to the first detected PCR, on the basis of the received values of PCRs and the position information of the PCRs in the TS.

When the PCR detection notification indicating that the data of PCR is detected from the TS is received, the time-stamp time interval calculator 110 calculates a time interval between the PCR included in the head of each processing block and the PCR detected subsequent to the corresponding PCR in the TS packets included in a second addition target block including plural processing blocks between the PCR detected subsequent to the first detected PCR and the final PCR in the TS from the value of PCR included in the head of each processing block, the value of PCR detected subsequent to the corresponding PCR, and the number of TS packets between the PCR included in the head of each processing block and the PCR detected subsequent to the corresponding PCR, on the basis of the received values of PCRs and the position information of the PCRs in the TS.

When the PCR detection notification indicating that the data of PCR is detected from the TS is received, the time-stamp time interval calculator 110 calculates a time interval between the finally detected PCR and the PCR detected just previous to the finally detected PCR in the TS packets included in a third addition target block between the final PCR in the TS and the tail of the TS from the value of the final PCR, the value of PCR detected just previous to the final PCR, and the number of TS packets between the final PCR and the PCR detected just previous to the final PCR, on the basis of the received values of PCRs and the position information of the PCRs in the TS.

More specifically, when the second or later PCR detection notification is received, the time-stamp time interval calculator 110 divides the input MPEG2-TS data into the TS packet processing block U1 between the head of the input MPEG2-TS and the first PCR, the TS packet processing blocks U2 and U3 between the PCR and PCR, and the TS packet processing block U4 between the final PCR of the input MPEG2-TS and the tail of the input MPEG2-TS on the basis of the values of PCRs and the PCR position information output from the PCR detector, and has a function of calculating the time interval Qn between the TS packets in each processing block obtained as the division result and the time stamp value Vn of the first packet of each processing block by the use of Expressions (1) to (4) and a function of outputting the calculated time interval Qn between the TS packets in each processing block and the time stamp value Vn of the first packet of each processing block to the time stamp adder 111.

$$Qn=(PCRn+1-PCRn)/Nn \qquad (1)$$

$$Rn=(PCRn+1-PCRn) \bmod Nn \qquad (2)$$

$$Cn=0 \qquad (3)$$

$$Vn=Vn-1+(PCRn+1-PCRn) \qquad (4)$$

Here, Vn represents a time stamp value of a first TS packet of a processing block Un, Qn represents a time interval between the TS packets in the processing block Un, Rn represents a surplus of the time interval between the TS packets in the processing block Un, Cn represents a carry-over of the time stamp value of the first TS packet in the processing block Un, and Nn represents the number of TS packets (including the first PCR) between the PCR and the PCR in the processing block Un.

For example, when it is assumed that the time interval of the TS packets in the processing block U1 is Q1, the surplus of the time interval between the TS packets in the processing block U1 is R1, the carry-over of the time stamp value of the first TS packet in the processing block U1 is C1, the number of TS packets between the PCR included in the processing block U1 and the PCR detected subsequent to the corresponding PCR is N1, and the number of TS packets between the head of the input TS and the corresponding PCR is N0, the following expressions for the processing block U1 are obtained. In the processing block U1, the value of V1 can be set to an arbitrary value.

$$Q1=(PCR2-PCR1)/N1$$

$$R1=(PCR2-PCR1) \bmod N1$$

$$Cn=(-R1 \times N0) \bmod N1$$

For example, when it is assumed that the time interval of the TS packets in the processing block U2 is Q2, the surplus of the time interval between the TS packets in the processing block U2 is R2, the carry-over of the time stamp value of the first TS packet in the processing block U2 is C2, the number of TS packets between the PCR included in the processing block U2 and the PCR detected subsequent to the corresponding PCR is N2, and the number of TS packets between the head of the input TS and the corresponding PCR is N0, the following expressions for the processing block U2 are obtained.

$$Q2 = (PCR3 - PCR2)/N2$$
$$R2 = (PCR3 - PCR2) \bmod N2$$
$$C2 = 0$$
$$V2 = V1 + Q1(N0+N1) + (R1(N0+N1)+C1)/N1$$
$$= V1 + ((PCR2 - PCR1) \times (N0+N1) + C1)/N1$$

In the time stamp adding device 1 according to the first embodiment, the time-stamp time interval calculator 110 is embodied by hardware, but may be embodied by software in view of reducing the installation space of a division circuit to further reduce the circuit scale.

For the TS packets included in the first addition target block between the head of the TS and the first detected PCR, the time stamp adder 111 calculates time stamp values to be added to the TS packets from the initial value of the time stamp and the time interval between the first detected PCR and the PCR detected subsequent to the first detected PCR calculated by the time-stamp time interval calculator 110, adds the calculated time stamp values to the TS packets included in the first addition target block between the head of the TS and the first detected PCR, and outputs the TS packets having the time stamps added thereto to the DMA interface 105 including the DMA buffer 105A.

For the TS packets included in the second addition target block including plural processing blocks between the PCR detected subsequent to the first detected PCR and the final PCR in the TS, the time stamp adder 111 calculates the time stamp value to be added to the TS packet existing in the head of each processing block from the time stamp value added to the TS packet existing in the head of the processing block just previous to each processing block, the PCR value included in the head of each processing block, and the PCR value detected subsequent to the corresponding PCR, calculates the time stamp value to be added to the TS packets in each processing block from the calculated time stamp value to be added to the TS packet existing in the head of each processing block and the calculated time interval between the PCR included in the head of each processing block and the PCR detected subsequent to the corresponding PCR, adds the calculated time stamp values to the TS packets included in the second addition target block including plural processing blocks between the PCR detected subsequent to the first detected PCR and the final PCR in the TS, and outputs the TS packets having the time stamps added thereto to the DMA interface 105 including the DMA buffer 105A.

For the TS packets included in the third addition target block existing between the final PCR in the TS and the tail of the TS, the time stamp adder 111 calculates the time stamp values to be added to the TS packets from the final PCR value and the time interval between the finally detected PCR and the PCR detected just previous to the finally detected PCR, adds the calculated time stamp values to the TS packets included in the third addition target block between the final PCR in the TS and the tail of the TS, and outputs the TS packets having the time stamps added thereto to the DMA interface 105 including the DMA buffer 105A.

More specifically, when the time intervals Qn between the TS packets in the processing blocks output from the time-stamp time interval calculator 110 and the time stamp value Vn of the first packets of the processing blocks are received, the time stamp adder 111 has a function of performing a process of reading the TS packet data stored in the DATA FIFO unit 106 from the first output port of the DATA FIFO unit 106 and adding the time stamps to the TS packets read from the first output port of the DATA FIFO unit 106 by the use of Expressions (5) to (8) and a function of outputting the TS packets having the time stamps added thereto to the DAM interface 105 including the DMA buffer 105A.

$$Vn[m]=Vn[m-1]+Qn+1 \text{ (where } Cn[m-1]+Rn \geq Nn) \tag{5}$$

$$Vn[m]=Vn[m-1]+Qn \text{ (where } Cn[m-1]+Rn<Nn) \tag{6}$$

$$Cn[m]=Cn[m-1]+Rn-Nn \text{ (where } Cn[m-1]+Rn \geq Nn) \tag{7}$$

$$Cn[m]=Cn[m-1]+Rn \text{ (where } Cn[m-1]+Rn<Nn) \tag{8}$$

The processes performed by the time stamp adding device 1 having the above-mentioned configuration will be described with reference the accompanying drawings.

Figure 5:
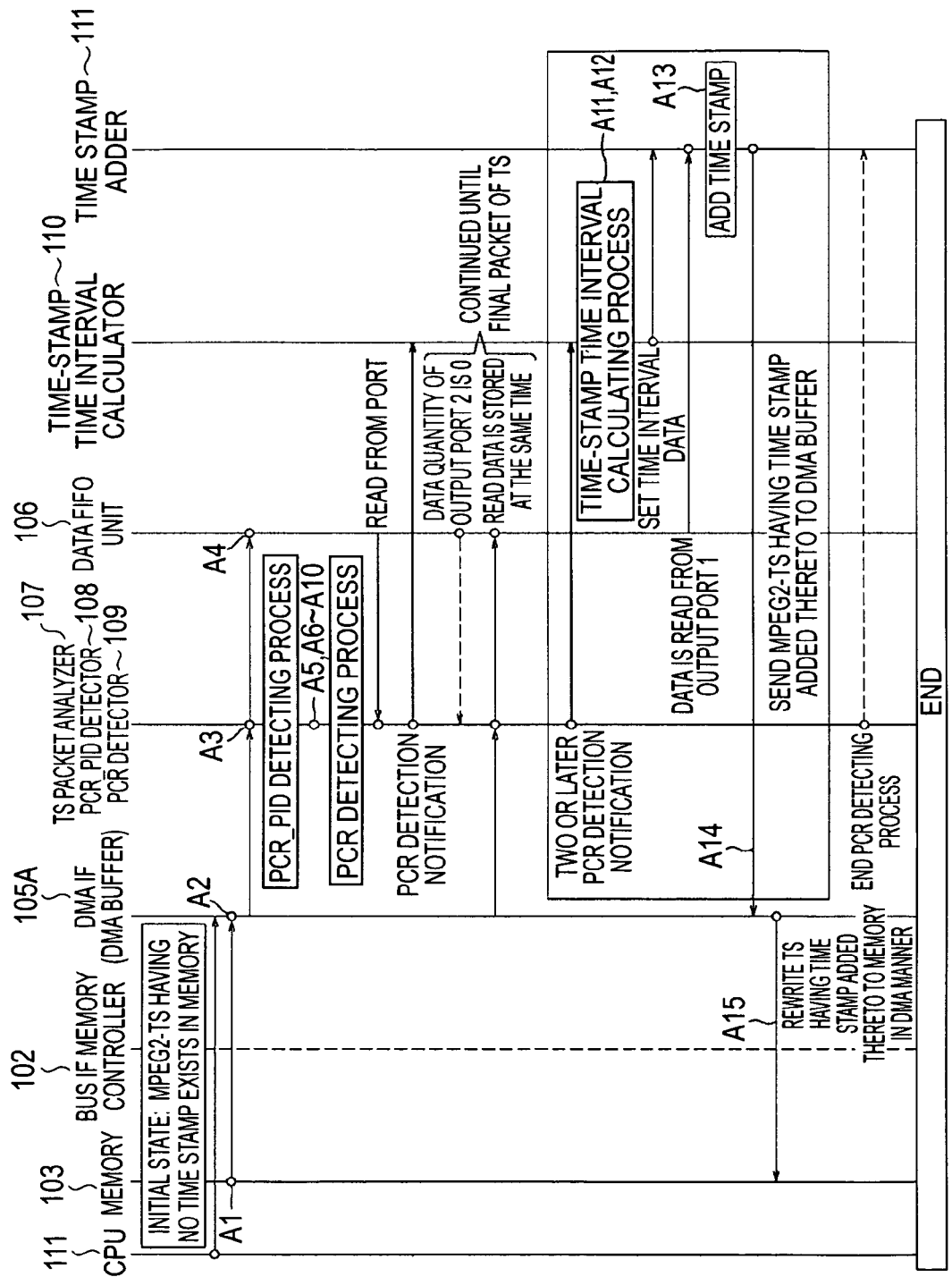
FIG. 5 is a diagram illustrating a sequence of processes carried out by the time stamp adding device according to the first embodiment of the invention.

FIG. 5 is a diagram illustrating a sequence of processes performed by the time stamp adding device 1 according to the first embodiment of the invention.

First, the CPU 112 reads the TS packet adding program from the main memory not shown, transmitting a reading instruction for reading the MPEG2-TS from the semiconductor memory to the DMA interface by the use of the read TS packet adding program, and enables the DMA transmission between the DMA interface 105 and the bus interface 102 by describing the address of the MPEG2-TS in the DMA descriptor (A1).

In process A2, the DMA interface 105 receives the MPEG2-TS data having no time stamp added thereto, which is read from the semiconductor memory 103 by the bus interface 102 and output from the bus interface 102, and stores the received MPEG2-TS data in the DMA buffer 105A built therein.

In process A3, the TS packet analyzer 107 determines whether the MPEG2-TS data is transmitted to the DMA buffer 105A built in the DMA interface 105 from the bus interface 102.

When it is determined in process A3 that the MPEG2-TS data is transmitted to the DMA buffer 105A built in the DMA interface 105 from the bus interface 102 (YES in A3), the PCR_PID detector 108 reads the MPEG2-TS data from the DMA buffer 105A and outputs the read MPEG2-TS data to the DATA FIFO unit 106 at the same time as reading the data from the DMA buffer 105A (A4).

The PCR_PID detector 108 detects the PCR_PID included in the PMT by analyzing the PMT included in the read MPEG2-TS from the head of the MPEG2-TS having no time stamp added thereto and being read from the DMA buffer 105A, the PCR_PID of which is unknown (A5).

For example, when the MPEG2-TS data shown in FIG. 3 is read from the semiconductor memory 103 and transmitted to the DMA buffer 105A, the PCR_PID detector 108 detects the PCR_PID by searching the MPEG2-TS data, detecting the PMT at the position β, and analyzing the detected PMT.

In the subsequent process, the PCR detector 109 starts a PCR detecting process including the following processes using the PCR_PID detected by the PCR_PID detector 108.

Specifically, the PCR detector 109 determines whether PID=PCR_PID (A6).

When it is determined in process A6 that PID=PCR_PID is satisfied (YES in A6), the PCR detector 109 determines whether a value of adaptation_table exists, that is, whether the value of adaptation_table is 10 or 11 and the value of adaptation_table_length is not 0 (A7).

On the other hand, when it is determined in process A6 that PID=PCR_PID is not satisfied (NO in A6), the PCR detector 109 performs a process of determining whether the TS packet is the tail of the MPEG2-TS.

When it is determined in process A7 that the value of adaptation_table exists, that is, that the value of adaptation_table is 10 or 11 and the value of adaptation_table_length is not 0 (YES in A7), the PCR detector 109 detects the position information indicating the position of the TS packet in the TS, for example, what position the TS packet is located at from the first TS packet, outputs the detected position of the TS packet in the TS to the time-stamp time interval calculator 110, and then determines whether PCR_flag=1 (A8).

When it is determined in process A7 that the value of adaptation_table does not exist, that is, that the value of adaptation_table is not 10 or 11 or the value of adaptation_table_length is 0 (NO in A7), the PCR detector 109 performs a process of determining whether the TS packet is the tail of the MPEG2-TS.

When it is determined in process A8 that PCR_flag=1 is satisfied (YES in A8), the PCR detector 109 acquires the PCR value and outputs the acquired PCR value to the time-stamp time interval calculator 110 (A9).

When it is determined in the above-mentioned process that PCR_flag=1 is not satisfied (NO in A8), the PCR detector 109 determines whether the TS packet is the tail of the MPEG2-TS (A10).

When it is determined in process A10 that the TS packet output from the CPU is the tail of the MPEG2-TS (YES in A10), the PCR detector 109 ends the sequence of processes.

When the check on whether the PCR is included in all the TS packets stored in the DATA FIFO unit 106 is ended, the PCR detector 109 repeatedly performs the above-mentioned PCR detecting process (processes from A4 to A10) on the data of TS packet subsequent to the TS packet read from the DMA buffer 105A by the PCR_PID detector 108 until it is determined that the TS packet to be processed is the final packet included in the TS.

By performing this sequence of processes, the data of TS packet read from the PCR_PID detector 108 is stored in the DATA FIFO unit 106. Accordingly, all the MPEG2-TS packets via the DMA buffer 105A are stored in the DATA FIFO unit 106 without overlapping with each other.

In process A11, when the second or later PCR detection notification is received, the time-stamp time interval calculator 110 divides the input MPEG2-TS data into the processing block U1 of the TS packets between the head of the input MPEG2-TS and the first PCR, the processing blocks U2 and U3 of the TS packets between the PCR and PCR, and the processing block U4 of the TS packets between the final PCR of the input MPEG2-TS and the tail of the input MPEG2-TS, on the basis of the PCR values output from the PCR detector 109 and the position information of the PCRs, and calculates the time interval Qn between the TS packets in each processing block obtained as the division result and the time stamp value Vn of the first packet of each processing block by the use of Expressions (1) to (4).

$$Qn=(PCRn+1-PCRn)/Nn \quad (1)$$

$$Rn=(PCRn+1-PCRn) \bmod Nn \quad (2)$$

$$Cn=0 \quad (3)$$

$$Vn=Vn-1+(PCRn+1-PCRn) \quad (4)$$

Here, Vn represents a time stamp value of a first TS packet of a processing block Un, Qn represents a time interval between the TS packets in the processing block Un, Rn represents a surplus of the time interval between the TS packets in the processing block Un, Cn represents a carry-over of the time stamp value of the first TS packet in the processing block Un, and Nn represents the number of TS packets (including the first PCR) between the PCR and the PCR in the processing block Un.

In process A12, the time-stamp time interval calculator 110 outputs the calculated time interval Qn between the TS packets in each processing block and the time stamp value Vn of the first packet of each processing block to the time stamp adder 111.

In process A13, when the time interval Qn between the TS packets in each processing block output from the time-stamp time interval calculator 110 and the time stamp value Vn of the first packet of each processing block are received, the time stamp adder 111 performs a process of reading the TS packet data stored in the DATA FIFO unit 106 from the first output port of the DATA FIFO unit 106, calculates the time stamp values to be added to the TS packets by the use of Expressions (5) to (8), and adding the calculated time stamp values to all the TS packets read from the DATA FIFO unit 106.

$$Vn[m]=Vn[m-1]+Qn+1 \text{ (where } Cn[m-1]+Rn \geq Nn\text{)} \quad (5)$$

$$Vn[m]=Vn[m-1]+Qn \text{ (where } Cn[m-1]+Rn<Nn\text{)} \quad (6)$$

$$Cn[m]=Cn[m-1]+Rn-Nn \text{ (where } Cn[m-1]+Rn \geq Nn\text{)} \quad (7)$$

$$Cn[m]=Cn[m-1]+Rn \text{ (where } Cn[m-1]+Rn<Nn\text{)} \quad (8)$$

In process A14, the time stamp adder 111 outputs the TS packets having the time stamp added thereto to the DMA interface 105 including the DMA buffer 105A.

In process A15, the DMA interface 105 outputs the TS packets having the time stamp added thereto, which are output from the time stamp adder 111, to the bus interface 102 in the DMA transmission manner.

Accordingly, the bus interface 102 stores the TS packet data having the time stamp added thereto, which are received from the DMA interface 105, in the semiconductor memory.

By perform the above-mentioned series of processes, the time stamp adding device 1 according to the first embodiment ends the sequence of processes.

As described above, according to the first embodiment, the TS packets included in the TS are searched from the head of the TS including the TS packets stored in the DMA buffer 105A, the PCR_PID included in the PMT is detected by the PCR_PID detector 108 by analyzing the PMT acquired as the search result, the TS packet having the same PCR_PID value as the PCR_PID value detected by the PCR_PID detector 108 is detected from the TS stored in the DMA buffer 105A, the PCR values and the position information of the TS packets in the TS are then acquired by the PCR detector 109 by analyzing the detected TS packets, the time interval for adding the time stamps is calculated by the time-stamp time interval calculator 110 on the basis of the PCR values detected by the PCR detector 109, and the time stamps are added to the TS packets stored in the DATA FIFO unit 106 by the time stamp adder 111 on the basis of the time interval calculated by the time-stamp time interval calculator 110. Accordingly, it is possible to improve the accuracy of the time stamps and to reduce the hardware scale.

According to the first embodiment, it is possible to add the time stamps to both the TS packets from the head of the TS stored in the DMA buffer 105A to the first detected PCR and the TS packets from the final PCR of the TS stored in the DMA buffer 105A to the tail of the TS.

According to the first embodiment, it is possible to minimize the difference between the real PCR values and the time stamp values added to the TS packets by considering the carry-over.

According to the first embodiment, since the number of transmissions of data from the CPU 112 to the data bus can be reduced, it is possible to prevent the overcrowding of the bus occurring in recording or reproducing other contents.

As a result, it is possible to reduce the possibility of interfering with other simultaneous processes of data such as recording or reproduction.

Second Embodiment

Figure 6:
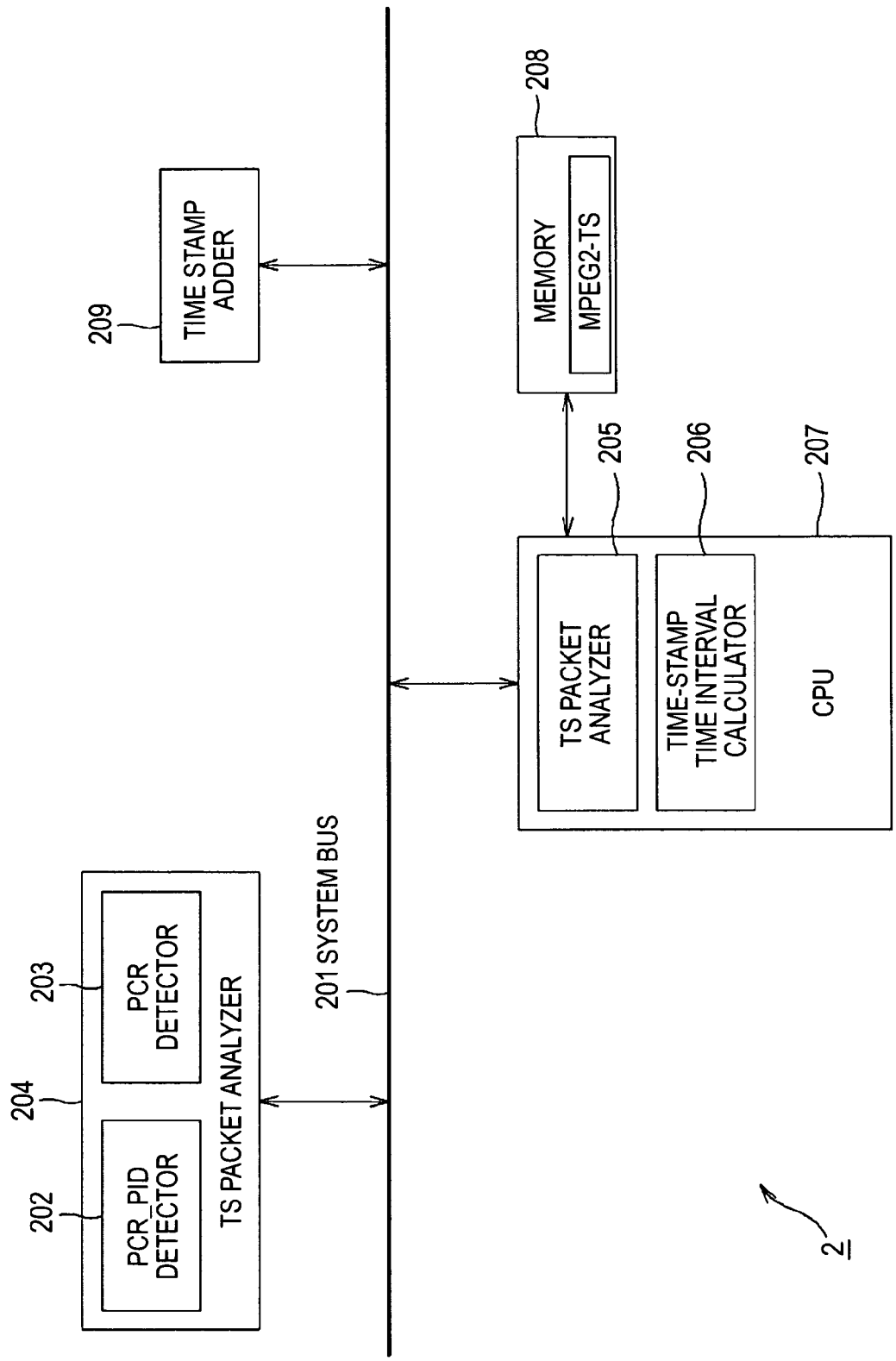
FIG. 6 is a block diagram illustrating a configuration of a time stamp adding device according to a second embodiment of the invention.

FIG. 6 is a block diagram illustrating a configuration of a time stamp adding device 2 according to a second embodiment of the invention.

Similarly to the time stamp adding device 1 according to the first embodiment, the time stamp adding device 2 according to the second embodiment is a device for adding time stamps having 4 byte data based on the same 27 MHz clock as PCR to TS packets having no time stamp added thereto, which are stored in a semiconductor memory built in the time stamp adding device and are transmitted in the format of 188-byte MPEG2-TS, to generate TS packets having the time stamps added thereto and outputting the generated TS packets having the time stamps added thereto to the outside.

As shown in FIG. 6, the time stamp adding device 2 according to the second embodiment includes a CPU 207 connected to a system bus 201, a semiconductor memory 208 from and to which data can be read and written by the CPU 207, a TS packet analyzer 204, and a time stamp adder 209.

Similarly to the time stamp adding device 1 according to the first embodiment, the semiconductor memory 208 stores the MPEG2-TS data having no time stamp added thereto as the processing target to which the time stamps should be added and including a processing block U1 including a PCR packet ax first appearing from the head of the MPEG2-TS data, and a PMT packet β with the number of TS packets N0+N1, a processing block U2 including a PMT packet with the number of TS packets N2, a processing block U3 including a PMT packet with the number of TS packets N3, and a processing block U4 including a PMT packet with the number of TS packets N3.

In the time stamp adding device 2 according to the second embodiment, when the MPEG2-TS data is input to the time stamp adding device 2, PCR_PID data is acquired by the PCR_PID detector 202 and PMT data is detected from the PCR_PID data.

Thereafter, the data from the head of the stream to the PMT is searched by the PCR detector 203 and PCR data is detected as the search result.

When the TS data shown in FIG. 3 is input, the time stamp adding device 2 according to the second embodiment divides the input TS data into the processing block U1, the processing block U2, the processing block U3, and the processing block U4 on the basis of the detected position of PCR.

The CPU 207 according to the second embodiment is a unit controlling the entire time stamp adding device 2 according to the second embodiment and includes a TS packet analyzer 205 and a time-stamp time interval calculator 206 of which the processes are embodied by a TS packet adding program, which is read from a main memory not shown.

The TS packet analyzer 205 has a function of reading data of MPEG2-TS stored in the semiconductor memory 208 and controlling the semiconductor memory 208, the PCR_PID detector 202, the PCR detector 203, the time-stamp time interval calculator 206, and the time stamp adder 209 to perform a PCR_PID detecting process, a PCR detecting process, a time-stamp time interval calculating process, and a time stamp adding process to be described later using the read data of MPEG2-TS.

The time-stamp time interval calculator 206 calculates a time interval between a first detected PCR and a PCR detected subsequent to the first detected PCR in the TS packets included in a first addition target block existing between the head of the TS and the first detected PCR from the value of the first detected PCR, the value of the PCR detected subsequent to the first detected PCR, and the number TS packets between the first detected PCR and the PCR detected subsequent to the first detected PCR.

The time-stamp time interval calculator 206 calculates a time interval between the PCR included in the head of each processing block and the PCR detected subsequent to the corresponding PCR in the TS packets included in a second addition target block including plural processing blocks between the PCR detected subsequent to the first detected PCR and the final PCR in the TS from the value of PCR included in the head of each processing block, the value of PCR detected subsequent to the corresponding PCR, and the number of TS packets between the PCR included in the head of each processing block and the PCR detected subsequent to the corresponding PCR.

The time-stamp time interval calculator 206 calculates a time interval between the finally detected PCR and the PCR detected just previous to the finally detected PCR in the TS packets included in a third addition target block between the final PCR in the TS and the tail of the TS from the value of the final PCR, the value of PCR detected just previous to the final PCR, and the number of TS packets between the final PCR and the PCR detected just previous to the final PCR.

More specifically, when the second or later PCR detection notification is received, the time-stamp time interval calculator 206 divides the input MPEG2-TS data into the TS packet processing block U1 between the head of the input MPEG2-TS and the first PCR, the TS packet processing blocks U2 and U3 between the PCR and PCR, and the TS packet processing block U4 between the final PCR of the input MPEG2-TS and the tail of the input MPEG2-TS on the basis of the PCR values and the PCR position information output from the PCR detector, and has a function of calculating the time interval Qn between the TS packets in each processing block obtained as the division result and the time stamp value Vn of the first packet of each processing block by the use of Expressions (1) to (4) and a function of outputting the calculated time interval Qn between the TS packets in each processing block and the time stamp value Vn of the first packet of each processing block to the time stamp adder 209 via the system bus 201.

$$=(PCR_{n+1}-PCR_n)/N_n \tag{1}$$

$$=(PCR_{n+1}-PCR_n) \bmod N_n \tag{2}$$

$$n=0 \tag{3}$$

$$=V_{n-1}+(PCR_n-PCR_{n-1}) \tag{4}$$

Here, Vn represents a time stamp value of a first TS packet of a processing block Un, Qn represents a time interval between the TS packets in the processing block Un, Rn represents a surplus of the time interval between the TS packets in the processing block Un, Cn represents a carry-over of the time stamp value of the first TS packet in the processing block Un, and Nn represents the number of TS packets (including the first PCR) between the PCR and the PCR in the processing block Un.

For example, when it is assumed that the time interval between the TS packets in the processing block U1 is Q1, the surplus of the time interval between the TS packets in the processing block U1 is R1, the carry-over of the time stamp value of the first TS packet in the processing block U1 is C1, the number of TS packets between the PCR included in the processing block U1 and the PCR detected subsequent to the corresponding PCR is N1, and the number of TS packets between the head of the input TS and the corresponding PCR is N0, the following expressions for the processing block U1 are obtained. In the processing block U1, the value of V1 can be set to an arbitrary value.

$$= (PCR2 - PCR1)/N1$$

$$1 = (PCR2 - PCR1) \bmod N1$$

$$n = (-R1 \times N0) \bmod N1$$

For example, when it is assumed that the time interval between the TS packets in the processing block U2 is Q2, the surplus of the time interval between the TS packets in the processing block U2 is R2, the carry-over of the time stamp value of the first TS packet in the processing block U2 is C2, the number of TS packets between the PCR included in the processing block U2 and the PCR detected subsequent to the corresponding PCR is N2, and the number of TS packets between the head of the input TS and the corresponding PCR is N0, the following expressions for the processing block U2 are obtained.

$$= (PCR3 - PCR2)/N2$$
$$2 = (PCR3 - PCR2) \bmod N2$$
$$= 0$$
$$= V1 + Q1(N0 + N1) + (R1(N0 + N1) + C1)/N1$$
$$= V1 + ((PCR2 - PCR1) \times (N0 + N1) + C1)/N1$$

The TS packet analyzer 204 includes a PCR_PID detector 202 and a PCR detector 203.

The PCR_PID detector 202 determines whether the data of the TS packets read from the semiconductor memory 208 is transmitted from the CPU 207 via the system bus 201 by the use of the TS packet analyzer 205 built in the CPU 207, and has a function of determining whether the PCR_PID in the TS packets transmitted from the CPU 207 is known when it is determined that the data of the TS packets is transmitted from the CPU 207 via the system bus 201, a function of detecting the PCR_PID included in the PMT by analyzing the PMT included in the read MPEG2-TS from the head of the MPEG2-TS read from the semiconductor memory 208 when it is determined that the PCR_PID is unknown, a function of acquiring the PCR values and the position information of the TS packets in the TS by detecting the TS packets having the same PCR_PID value as the detected PCR_PID value from the TS and then analyzing the detected TS packets, and a function of transmitting the PCR_PID detection notification indicating that the PCR_PID is detected to the CPU 207.

The PCR detector 203 has a function of performing a PCR detecting process of detecting the values of PCRs between the head of the TS and the PMT and the position information of the PCRs in the TS and detecting the values of all PCRs included in the TS packets between the PMT and the tail of the TS and the position information of the PCRs in the TS by receiving the MPEG2-TS data transmitted via the system bus 201 from the CPU 207 and analyzing the TS packets between the head of the TS and the PMT in the received MPEG2-TS data and a function of outputting a PCR detection notification indicating that the PCR data is detected from the TS packets, the detected PCR values, and the position information of the PCRs in the TS to the CPU 207 at the time of detecting the PCR data from the TS packets.

In the time stamp adding device 2 according to the second embodiment, the PCR_PID detector 202 and the PCR detector 203 are provided as a hardware functional block built in the TS packet analyzer 204. However, the PCR_PID detector 202 and the PCR detector 203 may be provided as physically different hardware functional blocks.

In the time stamp adding device 2 according to the second embodiment, the PCR_PID detector 202 and the PCR detector 203 are provided as a hardware functional block built in the TS packet analyzer 204, but may be provided as functional blocks which are embodied by a program stored in a main memory (not shown), read from the main memory and executed by the CPU 207.

For the TS packets included in the first addition target block between the head of the TS and the first detected PCR, the time stamp adder 209 calculates time stamp values to be added to the TS packets from the initial value of the time stamp and the time interval between the first detected PCR and the PCR detected subsequent to the first detected PCR calculated by the time-stamp time interval calculator 206, adds the calculated time stamp values to the TS packets included in the first addition target block between the head of the TS and the first detected PCR, and outputs the TS packets having the time stamps added thereto to the CPU 207.

For the TS packets included in the second addition target block including plural processing blocks between the PCR detected subsequent to the first detected PCR and the final PCR in the TS, the time stamp adder 209 calculates the time stamp value to be added to the TS packet existing in the head of each processing block from the time stamp value added to the TS packet existing in the head of the processing block just previous to each processing block, the PCR value included in the head of each processing block, and the PCR value detected subsequent to the corresponding PCR, calculates the time stamp value to be added to the TS packets in each processing block from the calculated time stamp value to be added to the TS packet existing in the head of each processing block and the calculated time interval between the PCR included in the head of each processing block and the PCR detected subsequent to the corresponding PCR, adds the calculated time stamp values to the TS packets included in the second addition target block including plural processing blocks between the PCR detected subsequent to the first detected PCR and the final PCR in the TS, and outputs the TS packets having the time stamps added thereto to the CPU 207.

For the TS packets included in the third addition target block existing between the final PCR in the TS and the tail of the TS, the time stamp adder 209 calculates the time stamp values to be added to the TS packets from the final PCR value and the time interval between the finally detected PCR and the PCR detected just previous to the finally detected PCR, adds the calculated time stamp values to the TS packets included in the third addition target block between the final PCR in the TS and the tail of the TS, and outputs the TS packets having the time stamps added thereto to the CPU 207.

More specifically, the time stamp adder 209 receives the time intervals Qn between the TS packets in the processing blocks output from the time-stamp time interval calculator 206, the time stamp value Vn of the first packets of the processing blocks, and the MPEG2-TS data as a time stamp adding target transmitted from the CPU, and has a function of performing a process of adding the time stamps to the TS packets received from the CPU 207 by the use of Expressions (5) to (8) and a function of outputting the TS packets having the time stamps added thereto to the CPU 207.

$$Vn[m]=Vn[m-1]+Qn+1 \text{ (where } Cn[m-1]+Rn \geq Nn) \quad (5)$$

$$Vn[m]=Vn[m-1]+Qn \text{ (where } Cn[m-1]+Rn<Nn) \quad (6)$$

$$Cn[m]=Cn[m-1]+Rn-Nn \text{ (where } Cn[m-1]+Rn \geq Nn) \quad (7)$$

$$Cn[m]=Cn[m-1]+Rn \text{ (where } Cn[m-1]+Rn<Nn) \quad (8)$$

The processes performed by the time stamp adding device 2 having the above-mentioned configuration will be described with reference the accompanying drawings.

Figure 7:
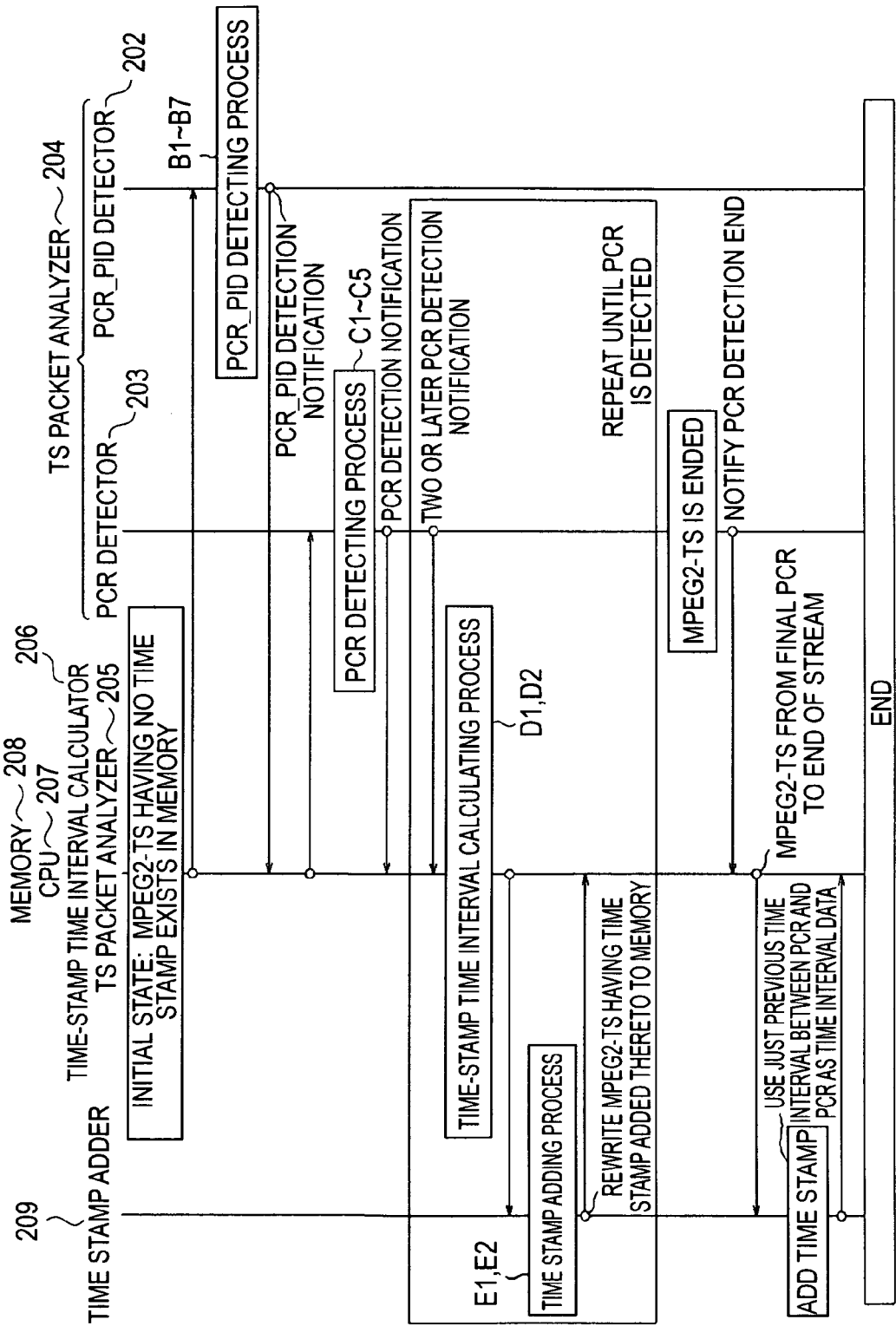
FIG. 7 is a diagram illustrating a sequence of processes carried out by the time stamp adding device according to the second embodiment of the invention.

FIG. 7 is a diagram illustrating a sequence of processes performed by the time stamp adding device 2 according to the second embodiment of the invention.

Figure 8:
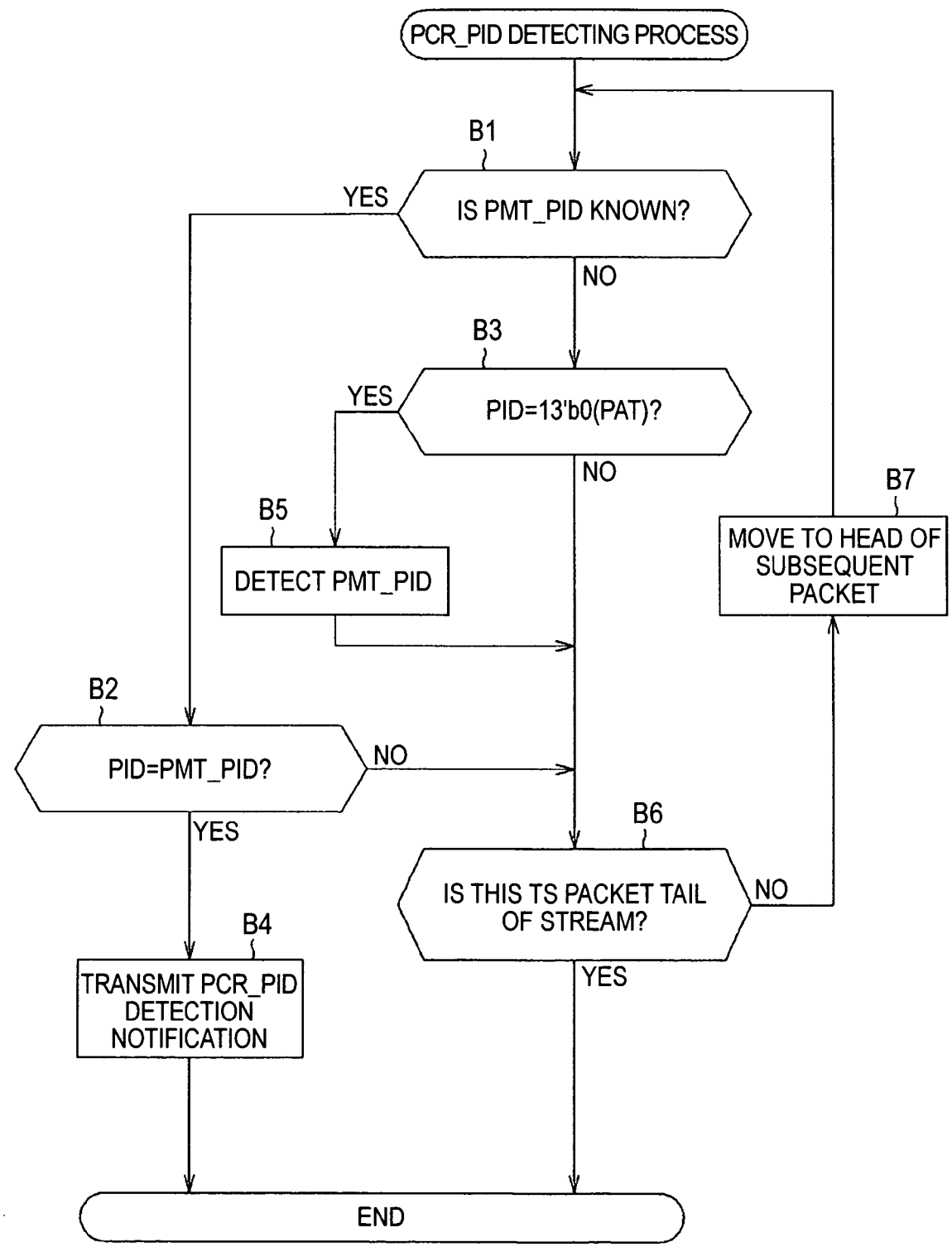
FIG. 8 is a flowchart illustrating processes carried out by the time stamp adding device according to the second embodiment of the invention.
Figure 9:
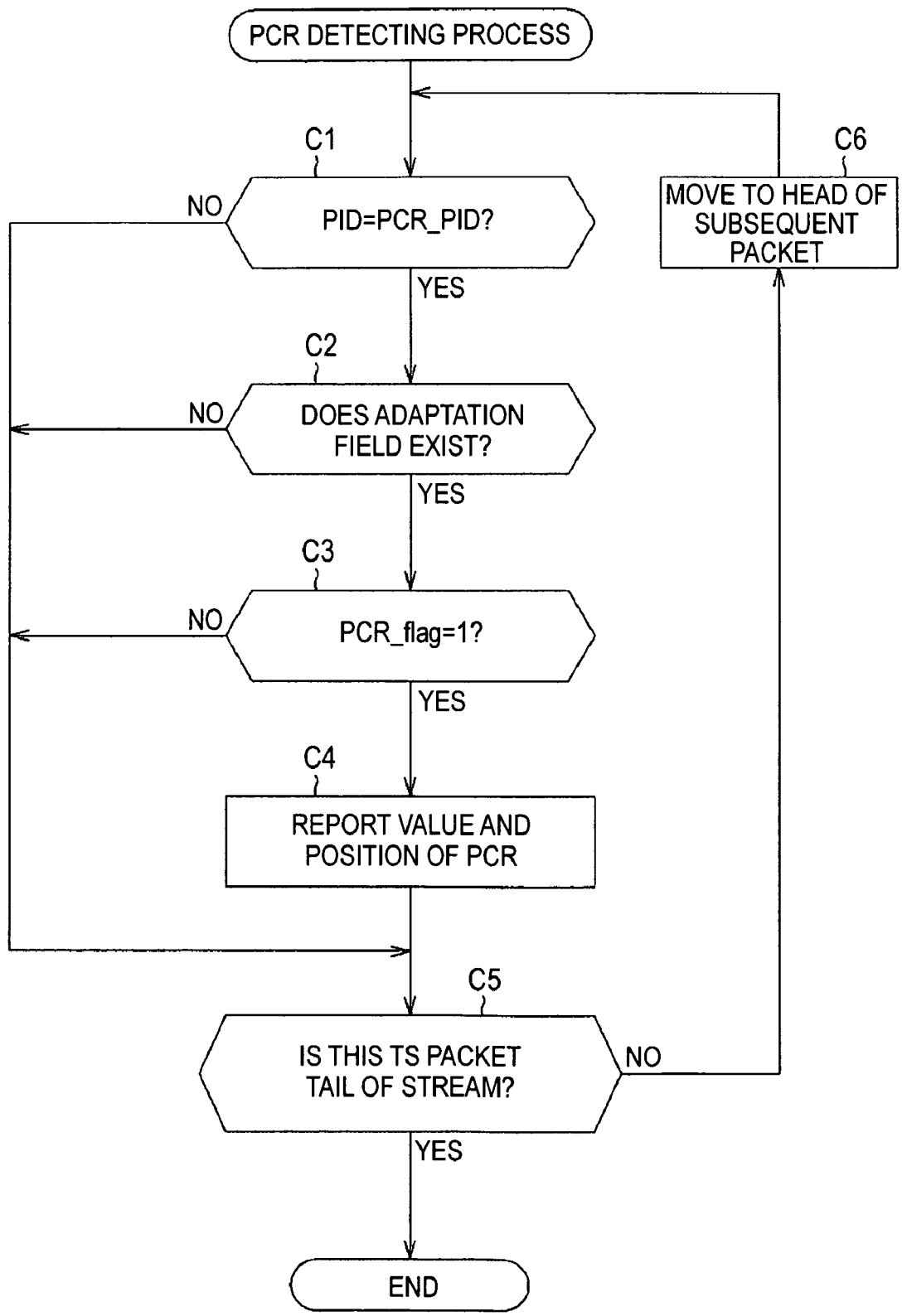
FIG. 9 is a flowchart illustrating processes carried out by the time stamp adding device according to the second embodiment of the invention.

FIGS. 8 and 9 are flowcharts illustrating the processes performed by the time stamp adding device 2 according to the second embodiment of the invention.

The time stamp adding device 2 according to the second embodiment sequentially performs the PCR_PID detecting process, the PCR detecting process, the time-stamp time interval calculating process, and the time stamp adding process.

PCR_PID Detecting Process

The PCR_PID detector 202 first determines whether the PMT_PID included in the TS transmitted from the CPU 207 is known (B1).

When it is determined in process B1 that the PMT_PID included in the TS transmitted from the CPU is known (YES in B1), the PCR_PID detector 202 determines whether PID=PMT_PID is satisfied (B2).

When it is determined in process B1 that the PMT_PID included in the TS transmitted from the CPU is unknown (NO in B1), the PCR_PID detector 202 detects the PAT data and determines whether the PID data included in the detected PAT satisfies PID=13'b0(PAT) (B3).

When it is determined in process B2 that PID=PMT_ID is satisfied (YES in B2), the PCR_PID detector 202 outputs the PCR_PID detection notification indicating that the PCR_PID is detected to the CPU (B4) and ends the sequence of processes.

When it is determined in process B3 that the PID data included in the detected PAT satisfies PID=13'b0(PAT) (YES in B3), the PCR_PID detector 202 detects the PMT_PID data included in the TS output via the system bus 201 from the CPU 207 (B5) and performs the process of B6 described later.

When it is determined in process B3 that the PID data included in the detected PAT does not satisfy PID=13'b0 (PAT) (NO in B3), the PCR_PID detector 202 determines whether TS packet output from the CPU 207 is the tail of the MPEG2-TS (B6).

When it is determined in process B2 described above that PID=PMT_PID is not satisfied (NO in B2), the PCR_PID detector 202 determines whether the same TS packet as the TS packet in process B6 output from the CPU 207 via the system bus 201 is the tail of the MPEG2-TS.

When it is determined in process B6 that the TS packet output from the CPU 207 via the system bus 201 is the tail of the MPEG2-TS (YES in B6), the PCR_PID detector 202 ends the sequence of processes.

When it is determined in process B6 that the TS packet output from the CPU 207 via the system bus 201 is not the tail of the MPEG2-TS (NO in B6), the PCR_PID detector 202 performs the processes of A1 to A6 on the head of the subsequent TS packet (B7) until the TS packet to be processed is the final packet included in the TS.

By performing the above-mentioned series of processes, the PCR_PID detector 202 according to the second embodiment ends the sequence of processes.

PCR Detecting Process

The PCR detector 203 first determines whether PID=PCR_PID is satisfied (C1).

When it is determined in process C1 that PID=PCR_PID is satisfied (YES in C1), the PCR detector 203 determines whether a value of adaptation_table exists, that is, whether the value of adaptation_table is 10 or 11 and the value of adaptation_table_length is not 0 (C2).

On the other hand, when it is determined in process C1 that PID=PCR_PID is not satisfied (NO in C1), the PCR detector 203 performs a determination process of C5 to be described later.

When it is determined in process C2 that the value of adaptation_table exists, that is, that the value of adaptation_table is 10 or 11 and the value of adaptation_table_length is not 0 (YES in C2), the PCR detector 203 detects the position of the TS packet in the entire TS, outputs the detected position of the TS packet in the entire TS to the CPU 207, and then determines whether PCR_flag=1 is satisfied (C3).

When it is determined in process C2 that the value of adaptation_table does not exist, that is, that the value of adaptation_table is not 10 or 11 or the value of adaptation_table_length is 0 (NO in C2), the PCR detector 203 performs the determination process of C5 to be described later.

When it is determined in process C3 that PCR_flag=1 is satisfied (YES in C3), the PCR detector 203 acquires the PCR value and outputs the acquired PCR value to the CPU (C4).

When it is determined in process C3 that PCR_flag=1 is not satisfied (NO in C3), the PCR detector 203 determines whether the TS packet output from the CPU 207 is the tail of the MPEG2-TS (C5).

When it is determined in process C5 that the TS packet output from the CPU 207 is the tail of the MPEG2-TS (YES in C5), the PCR detector 203 ends the sequence of processes.

When it is determined in process C5 that the TS packet output from the CPU 207 via the system bus 201 is not the tail of the MPEG2-TS (NO in C5), the PCR detector 203 repeatedly performs the processes of C1 to C5 from the head of the subsequent TS packet (C6) until the TS packet to be processed is the final packet included in the TS.

The PCR detector 203 according to the second embodiment ends the sequence of processes by performing the above-mentioned series of processes.

Time-Stamp Time Interval Calculating Process

When the second or later PCR detection notification is received, the time-stamp time interval calculator 206 divides the input MPEG2-TS data into the processing block U1 of the TS packets between the head of the input MPEG2-TS and the first PCR, the processing blocks U2 and U3 of the TS packets between the PCR and PCR, and the processing block U4 of the TS packets between the final PCR of the input MPEG2-TS and the tail of the input MPEG2-TS, on the basis of the PCR values output from the PCR detector 203 and the position information of the PCRs, and calculates the time interval Qn between the TS packets in each processing block obtained as the division result and the time stamp value Vn of the first packet of each processing block by the use of Expressions (1) to (4) (D1).

$$Qn = (PCRn+1 - PCRn)/Nn \quad (1)$$

$$Rn = (PCRn+1 - PCRn) \bmod Nn \quad (2)$$

$$Cn = 0 \quad (3)$$

$$Vn = Vn-1 + (PCRn-1 - PCRn) \quad (4)$$

Here, Vn represents a time stamp value of a first TS packet of a processing block Un, Qn represents a time interval between the TS packets in the processing block Un, Rn represents a surplus of the time interval between the TS packets in the processing block Un, Cn represents a carry-over of the time stamp value of the first TS packet in the processing block Un, and Nn represents the number of TS packets (including the first PCR) between the PCR and the PCR in the processing block Un.

In other words, the time-stamp time interval calculator 206 calculates a time interval between a first detected PCR and a PCR detected subsequent to the first detected PCR in the TS packets included in a first addition target block existing between the head of the TS and the first detected PCR from the value of the first detected PCR, the value of the PCR detected subsequent to the first detected PCR, and the number TS packets between the first detected PCR and the PCR detected subsequent to the first detected PCR.

The time-stamp time interval calculator 206 calculates a time interval between the PCR included in the head of each processing block and the PCR detected subsequent to the corresponding PCR in the TS packets included in a second addition target block including plural processing blocks between the PCR detected subsequent to the first detected PCR and the final PCR in the TS from the value of PCR included in the head of each processing block, the value of PCR detected subsequent to the corresponding PCR, and the number of TS packets between the PCR included in the head of each processing block and the PCR detected subsequent to the corresponding PCR.

The time-stamp time interval calculator 206 calculates a time interval between the finally detected PCR and the PCR detected just previous to the finally detected PCR in the TS packets included in a third addition target block between the final PCR in the TS and the tail of the TS from the value of the final PCR, the value of PCR detected just previous to the final PCR, and the number of TS packets between the final PCR and the PCR detected just previous to the final PCR.

In process D2, the time-stamp time interval calculator 206 outputs the calculated time interval Qn between the TS packets in each processing block and the calculated time stamp value Vn of the first packet in each processing block to the time stamp adder 209.

The time-stamp time interval calculator 206 according to the third embodiment of the invention ends the sequence of processes by performing the above-mentioned series of processes.

Time Stamp Adding Process

First, the time stamp adder 209 receives the time interval Qn between the TS packets in each processing block, which is output from the time-stamp time interval calculator 206, the time stamp value Vn of the first packet in each processing block, and the MPEG2-TS data as a target to have the time stamp added thereto, which is transmitted from the CPU, and performs the process of adding the time stamp to the TS packet received from the CPU 207 via the system bus 201 by the use of Expressions (5) to (8) (E1).

$$Vn[m] = Vn[m-1] + Qn + 1 \text{ (where } Cn[m-1] + Rn \geq Nn) \quad (5)$$

$$Vn[m] = Vn[m-1] + Qn \text{ (where } Cn[m-1] + Rn < Nn) \quad (6)$$

$$Cn[m] = Cn[m-1] + Rn - Nn \text{ (where } Cn[m-1] + Rn \geq Nn) \quad (7)$$

$$Cn[m] = Cn[m-1] + Rn \text{ (where } Cn[m-1] + Rn < Nn) \quad (8)$$

In other words, for the TS packets included in the first addition target block between the head of the TS and the first detected PCR, the time stamp adder 209 calculates time stamp values to be added to the TS packets from the initial value of the time stamp and the time interval between the first detected PCR and the PCR detected subsequent to the first detected PCR calculated by the time-stamp time interval calculator 206, adds the calculated time stamp values to the TS packets included in the first addition target block between the head of the TS and the first detected PCR, and outputs the TS packets having the time stamps added thereto to the CPU 207.

For the TS packets included in the second addition target block including plural processing blocks between the PCR detected subsequent to the first detected PCR and the final PCR in the TS, the time stamp adder 209 calculates the time stamp value to be added to the TS packet existing in the head of each processing block from the time stamp value added to the TS packet existing in the head of the processing block just previous to each processing block, the PCR value included in the head of each processing block, and the PCR value detected subsequent to the corresponding PCR, calculates the time stamp value to be added to the TS packets in each processing block from the calculated time stamp value to be added to the TS packet existing in the head of each processing block and the calculated time interval between the PCR included in the head of each processing block and the PCR detected subsequent to the corresponding PCR, adds the calculated time stamp values to the TS packets included in the second addition target block including plural processing blocks between the PCR detected subsequent to the first detected PCR and the final PCR in the TS, and outputs the TS packets having the time stamps added thereto to the CPU 207.

For the TS packets included in the third addition target block existing between the final PCR in the TS and the tail of the TS, the time stamp adder 209 calculates the time stamp values to be added to the TS packets from the final PCR value and the time interval between the finally detected PCR and the PCR detected just previous to the finally detected PCR, adds the calculated time stamp values to the TS packets included in the third addition target block between the final PCR in the TS and the tail of the TS, and outputs the TS packets having the time stamps added thereto to the CPU 207.

In process E2, the time stamp adder 209 outputs the TS packets having the time stamps added thereto to the CPU 207. Accordingly, the TS packets having the time stamps added thereto are written to the semiconductor memory 208 by the CPU 207.

The time stamp adder 209 according to the second embodiment of the invention ends the sequence of processes by performing the above-mentioned series of processes.

According to the above-mentioned embodiment, the PCR_PID included in the PMT is detected by the PCR_PID detector 202 by analyzing the PMT from the head of the TS including the TS packets which is stored in the semiconductor memory 208, the TS packet having the same PCR_PID value as the PCR_PID value detected by the PCR_PID detector 202 is detected from the TS stored in the semiconductor memory, the PCR value and the position information of the corresponding TS packet in the TS are acquired by the PCR detector 203 by analyzing the detected TS packet, the time interval for adding the time stamps is calculated by the time-stamp time interval calculator 206 on the basis of the PCR value detected by the PCR detector 203, and the time stamps are added to the TS packets stored in the semiconductor memory 208 by the time stamp adder 209 on the basis of the time interval calculated by the time-stamp time interval calculator 206. Accordingly, it is possible to improve the accuracy of the time stamps and to reduce the hardware scale.

It should be understood by those skilled in the art that various modifications, combinations, sub-combinations and alterations may occur depending on design requirements and other factors insofar as they are within the scope of the appended claims or the equivalents thereof.

What is claimed is:

1. A time stamp adding device comprising:
PCR_PID detecting means for detecting a PCR_PID (Program Clock Reference Packet Identifier) included in a PMT (Program Map Table) by searching TS packets included in a TS (Transport Stream) from the head of the TS including a plurality of TS packets having no time stamp added thereto, being input from the outside, and being transmitted in a MPEG2-TS (MPEG2-Transport Stream) format and analyzing the PMT obtained as the search result;
PCR detecting means for detecting values of PCRs (Program Clock Reference) included between the head of the TS and the PMT and position information of the PCRs in the TS and detecting values of all PCRs included in the TS packets between the PMT and the tail of the TS and position information of the PCRs in the TS by analyzing the TS packets included between the head of the TS and the PMT;
time interval calculating means for calculating a time interval for adding a time stamp and a value of the time stamp to be added on the basis of the PCR values detected by the PCR detecting means; and
time stamp adding means for adding the time stamps calculated by the time interval calculating means to the TS packets having no time stamp added thereto, which is input from the outside, on the basis of the time interval calculated by the time interval calculating means,
wherein the time interval calculating means
calculates a time interval between a first detected PCR and a PCR detected subsequent to the first detected PCR in the TS packets included in a first addition target block existing from the head of the TS to the first detected PCR on the basis of the value of the first detected PCR, the value of the PCR detected subsequent to the first detected PCR, and the number of TS packets between the first detected PCR and the PCR detected subsequent to the first detected PCR and calculates values of time stamps to be added to the TS packets on the basis of an initial value of the time stamp and the time interval between the first detected PCR and the PCR detected subsequent to the first detected PCR,
calculates a time interval between a first PCR and a PCR detected subsequent to the first PCR in each processing block among the TS packets included in a second addition target block including a plurality of processing blocks from the PCR detected subsequent to the first detected PCR to a final PCR in the TS on the basis of the value of the first PCR in each processing block, the value of the PCR detected subsequent to the first PCR, and the number of TS packets between the first PCR in each processing block and the PCR detected subsequent to the first PCR, calculates a value of a time stamp to be added to the TS packet in the head of each processing block on the basis of the value of the time stamp added to the first TS packet in the processing block just previous to each processing block, the value of the first PCR in each processing block, and the value of the PCR detected subsequent to the first PCR, and calculates the values of the time stamps to be added to the TS packets in each processing block on the basis of the calculated value of the time stamp to be added to the TS packet in the head of each processing block and the calculated time interval between the first PCR in each processing block and the PCR detected subsequent to the first PCR, and
calculates a time interval between a final PCR and a PCR detected just previous to the final PCR in the TS packets included in a third addition target block existing between the final PCR of the TS and the tail of the TS on the basis of the value of the final PCR, the value of the PCR detected just previous to the final PCR, and the number of TS packets between the final PCR and the PCR detected just previous to the final PCR, and calculates values of time stamps to be added to the TS packets on the basis of the value of the final PCR and the time interval between the final PCR and the PCR detected just previous to the final PCR.

2. The time stamp adding device according to claim 1, further comprising first storage means for storing the TS including a plurality of TS packets having no time stamp added thereto which are transmitted in the MPEG2-TS manner,
wherein the time stamp adding means adds the time stamps to the TS packets stored in the first storage means on the basis of the time interval calculated by the time interval calculating means.

3. The time stamp adding device according to claim 2, further comprising second storage means for temporarily storing the TS packets read from the first storage means in a first-input first-output manner,
wherein the second storage means includes
an input port inputting data of the TS packets from the outside,
a first output port outputting the TS packets from the input port to the time stamp adding means, and
a second output port outputting the TS packet input from the input port to the PCR detecting means so as to check whether the PCR is included in the TS packet input from the input port, and
wherein the input of the TS packets from the input port is stopped when the check on whether the PCR is included in the TS packet is started for all the TS packets input from the input port and the input of the TS packets from the input port is resumed when the check on whether the PCR is included in the TS packets is ended for all the TS packets input from the input port.

4. The time stamp adding device according to claim 3, wherein the second storage means receives the data, which is read from the first storage means by the PCR detecting means, from the input port.

5. The time stamp adding device according to claim 3, wherein the PCR detecting means
outputs the TS packets read from the first storage means to the PCR_PID detecting means when the PCR_PID is unknown, reads the data of the TS packets from the second output port of the second storage means and outputs the read data of the TS packets to the PCR_PID detecting means when the PCR_PID is known, and reads all the TS packets, which are input to the second storage means from the input port, from the second output port of the second storage means, reads the TS packets from the first storage means when the check on whether the PCR is included in the TS packet is ended for all the TS packets, and outputs the read TS packets to the PCR_PID detecting means.

6. The time stamp adding device according to claim 2, wherein the first storage means is built in a DMA (Direct Memory Access) interface which is an interface for transmitting the TS packets in a DMA transmission manner.

7. The time stamp adding device according to claim 1, wherein the PCR_PID detecting means detects a PAT (Program Association Table) from the MPEG2-TS, acquires a PMT_PID (Program Map Table Packet Identifier) by analyzing the detected PAT, detects a PMT from the acquired PMT_PID, acquires the PCR_PID by analyzing the detected PMT, and outputs the acquired PCR_PID.

8. A time stamp adding method comprising the steps of:

detecting a PCR_PID included in a PMT by searching TS packets included in a TS from the head of the TS including a plurality of TS packets having no time stamp added thereto, being input from the outside, and being transmitted in a MPEG2-TS format and analyzing the PMT obtained as the search result;

detecting values of PCRs included between the head of the TS and the PMT and position information of the PCRs in the TS and detecting values of all PCRs included in the TS packets between the PMT and the tail of the TS and position information of the PCRs in the TS by analyzing the TS packets included between the head of the TS and the PMT;

calculating a time interval for adding a time stamp and a value of the time stamp to be added on the basis of the PCR values detected in the step of detecting the values of PCRs; and adding the time stamps calculated in the step of calculating the time interval to the TS packets having no time stamp added thereto, which is input from the outside, on the basis of the time interval calculated in the step of calculating the time interval, wherein the step of calculating a time interval includes calculating a time interval between a first detected PCR and a PCR detected subsequent to the first detected PCR in the TS packets included in a first addition target block existing from the head of the TS to the first detected PCR on the basis of the value of the first detected PCR, the value of the PCR detected subsequent to the first detected PCR, and the number of TS packets between the first detected PCR and the PCR detected subsequent to the first detected PCR and calculating values of time stamps to be added to the TS packets on the basis of an initial value of the time stamp and the time interval between the first detected PCR and the PCR detected subsequent to the first detected PCR, calculating a time interval between a first PCR and a PCR detected subsequent to the first PCR in each processing block among the TS packets included in a second addition target block including a plurality of processing blocks from the PCR detected subsequent to the first detected PCR to a final PCR in the TS on the basis of the value of the first PCR in each processing block, the value of the PCR detected subsequent to the first PCR, and the number of TS packets between the first PCR in each processing block and the PCR detected subsequent to the first PCR, calculating a value of a time stamp to be added to the TS packet in the head of each processing block on the basis of the value of the time stamp added to the first TS packet in the processing block just previous to each processing block, the value of the first PCR in each processing block, and the value of the PCR detected subsequent to the first PCR, and calculating the values of the time stamps to be added to the TS packets in each processing block on the basis of the calculated value of the time stamp to be added to the TS packet in the head of each processing block and the calculated time interval between the first PCR in each processing block and the PCR detected subsequent to the first PCR, and calculating a time interval between a final PCR and a PCR detected just previous to the final PCR in the TS packets included in a third addition target block existing between the final PCR of the TS and the tail of the TS on the basis of the value of the final PCR, the value of the PCR detected just previous to the final PCR, and the number of TS packets between the final PCR and the PCR detected just previous to the final PCR, and calculating values of time stamps to be added to the TS packets on the basis of the value of the final PCR and the time interval between the final PCR and the PCR detected just previous to the final PCR.

9. A time stamp adding program stored in a non-transitory storage medium for a computer of a time stamp adding device for adding a time stamp to a TS including TS packets having no time stamp added thereto and being transmitted in a MPEG2-TS format, the time stamp adding program instructing the computer of the time stamp adding device to perform the steps of:

detecting a PCR_PID included in a PMT by searching TS packets included in a TS from the head of the TS including a plurality of TS packets having no time stamp added thereto, being input from the outside, and being transmitted in a MPEG2-TS format and analyzing the PMT obtained as the search result;

detecting values of PCRs included between the head of the TS and the PMT and position information of the PCRs in the TS and detecting values of all PCRs included in the TS packets between the PMT and the tail of the TS and position information of the PCRs in the TS by analyzing the TS packets included between the head of the TS and the PMT;

calculating a time interval for adding a time stamp and a value of the time stamp to be added on the basis of the PCR values detected in the step of detecting the values of PCRs; and adding the time stamps calculated in the step of calculating the time interval to the TS packets having no time stamp added thereto, which is input from the outside, on the basis of the time interval calculated in the step of calculating the time interval, wherein the step of calculating a time interval includes calculating a time interval between a first detected PCR and a PCR detected subsequent to the first detected PCR in the TS packets included in a first addition target block existing from the head of the TS to the first detected PCR on the basis of the value of the first detected PCR, the value of the PCR detected subsequent to the first detected PCR, and the number of TS packets between the first detected PCR and the PCR detected subsequent to the first detected PCR and calculating values of time stamps to be added to the TS packets on the basis of an initial value of the time stamp and the time interval between the first detected PCR and the PCR detected subsequent to the first detected PCR, calculating a time interval between a first PCR and a PCR detected subsequent to the first PCR in each processing block among the TS packets included in a second addition target block including a plurality of processing blocks from the PCR detected subsequent to the first detected PCR to a final PCR in the TS on the basis of the value of the first PCR in each processing block, the value of the PCR detected subsequent to the first PCR, and the number of TS packets between the first PCR in each processing block and the PCR detected subsequent to the first PCR, calculating a value of a time stamp to be added to the TS packet in the head of each processing block on the basis of the value of the time stamp added to the first TS packet in the processing block just previous to each processing block, the value of the first PCR in each processing block, and the value of the PCR detected subsequent to the first PCR, and calculating the values of the time stamps to be added to the TS packets in each processing block on the basis of the calculated value of the time stamp to be added to the TS packet in the head of each processing block and the calculated time interval between the first PCR in each processing block and the PCR detected subsequent to the first PCR, and calculating a time interval between a final PCR and a PCR detected just previous to the final PCR in the TS packets included in a third addition target block existing between the final PCR of the TS and the tail of the TS on the basis of the value of the final PCR, the value of the PCR detected just previous to the final PCR, and the number of TS packets between the final PCR and the PCR detected just previous to the final PCR, and calculating values of time stamps to be added to the TS packets on the basis of the value of the final PCR and the time interval between the final PCR and the PCR detected just previous to the final PCR.

10. A time stamp adding device comprising:

a PCR_PID detecting unit configured to detect a PCR_PID (Program Clock Reference Packet Identifier) included in a PMT (Program Map Table) by searching TS packets included in a TS (Transport Stream) from the head of the TS including a plurality of TS packets having no time stamp added thereto, being input from the outside, and being transmitted in a MPEG2-TS (MPEG2-Transport Stream) format and analyzing the PMT obtained as the search result;

a PCR detecting unit configured to detect values of PCRs (Program Clock Reference) included between the head of the TS and the PMT and position information of the PCRs in the TS and to detect values of all PCRs included in the TS packets between the PMT and the tail of the TS and position information of the PCRs in the TS by analyzing the TS packets included between the head of the TS and the PMT;

a time interval calculating unit configured to calculate a time interval for adding a time stamp and a value of the time stamp to be added on the basis of the PCR values detected by the PCR detecting unit; and a time stamp adding unit configured to add the time stamps calculated by the time interval calculating unit to the TS packets having no time stamp added thereto, which is input from the outside, on the basis of the time interval calculated by the time interval calculating unit, wherein the time interval calculating unit calculates a time interval between a first detected PCR and a PCR detected subsequent to the first detected PCR in the TS packets included in a first addition target block existing from the head of the TS to the first detected PCR on the basis of the value of the first detected PCR, the value of the PCR detected subsequent to the first detected PCR, and the number of TS packets between the first detected PCR and the PCR detected subsequent to the first detected PCR and calculates values of time stamps to be added to the TS packets on the basis of an initial value of the time stamp and the time interval between the first detected PCR and the PCR detected subsequent to the first detected PCR, calculates a time interval between a first PCR and a PCR detected subsequent to the first PCR in each processing block among the TS packets included in a second addition target block including a plurality of processing blocks from the PCR detected subsequent to the first detected PCR to a final PCR in the TS on the basis of the value of the first PCR in each processing block, the value of the PCR detected subsequent to the first PCR, and the number of TS packets between the first PCR in each processing block and the PCR detected subsequent to the first PCR, calculates a value of a time stamp to be added to the TS packet in the head of each processing block on the basis of the value of the time stamp added to the first TS packet in the processing block just previous to each processing block, the value of the first PCR in each processing block, and the value of the PCR detected subsequent to the first PCR, and calculates the values of the time stamps to be added to the TS packets in each processing block on the basis of the calculated value of the time stamp to be added to the TS packet in the head of each processing block and the calculated time interval between the first PCR in each processing block and the PCR detected subsequent to the first PCR, and calculates a time interval between a final PCR and a PCR detected just previous to the final PCR in the TS packets included in a third addition target block existing between the final PCR of the TS and the tail of the TS on the basis of the value of the final PCR, the value of the PCR detected just previous to the final PCR, and the number of TS packets between the final PCR and the PCR detected just previous to the final PCR, and calculates values of time stamps to be added to the TS packets on the basis of the value of the final PCR and the time interval between the final PCR and the PCR detected just previous to the final PCR.

* * * * *